US012148086B2

(12) United States Patent
Zhang et al.

(10) Patent No.: US 12,148,086 B2
(45) Date of Patent: *Nov. 19, 2024

(54) METHODS AND SYSTEMS FOR 0-PHASE MOTION VECTORS IN 3D GRAPHICS

(71) Applicant: Pixelworks Semiconductor Technology (Shanghai) Co. Ltd., Shanghai (CN)

(72) Inventors: Hongmin Zhang, Santa Clara, CA (US); Miao Sima, Shanghai (CN); Gongxian Liu, Shanghai (CN); Zongming Han, Shanghai (CN); Junhua Chen, Shanghai (CN); Guohua Cheng, Shanghai (CN); Baochen Liu, Shanghai (CN); Neil Woodall, Newport Beach, CA (US); Yue Ma, Los Altos, CA (US); Huili Han, Shanghai (CN)

(73) Assignee: PIXELWORKS SEMICONDUCTOR TECHNOLOGY (SHANGHAI) CO. LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,217

(22) Filed: Nov. 17, 2023

(65) Prior Publication Data

US 2024/0087210 A1    Mar. 14, 2024

Related U.S. Application Data

(63) Continuation of application No. 17/656,131, filed on Mar. 23, 2022, now Pat. No. 11,861,783.

(30) Foreign Application Priority Data

Feb. 28, 2022    (CN) .......................... 202210190985.3

(51) Int. Cl.
| G06T 15/04 | (2011.01) |
| G06T 7/20  | (2017.01) |
| G06T 7/50  | (2017.01) |
| G06T 7/70  | (2017.01) |

(52) U.S. Cl.
CPC ................ G06T 15/04 (2013.01); G06T 7/20 (2013.01); G06T 7/50 (2017.01); G06T 7/70 (2017.01)

(58) Field of Classification Search
None
See application file for complete search history.

(56) References Cited

U.S. PATENT DOCUMENTS

| 9,094,561 | B1 | 7/2015 | Cheng et al. |
| 9,106,926 | B1 | 8/2015 | Li et al. |
| 9,357,161 | B1 | 5/2016 | Cheng et al. |
| 2019/0340812 | A1 | 11/2019 | Fuetterling et al. |
| 2020/0222019 | A1 | 7/2020 | Katsevich et al. |
| 2023/0245326 | A1 | 8/2023 | Sima et al. |

*Primary Examiner* — Robert J Craddock
(74) *Attorney, Agent, or Firm* — McCoy Russell LLP

(57) ABSTRACT

Various methods are provided for the generation of motion vectors in the context of 3D computer-generated images. In one example, a method includes generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture, each MV0 determined based on a camera MV0 and an object MV0, and outputting MV1 texture and the MV0 texture for image processing.

20 Claims, 16 Drawing Sheets

METHODS AND SYSTEMS FOR 0-PHASE MOTION VECTORS IN 3D GRAPHICS

CROSS REFERENCE TO RELATED APPLICATIONS

The present application is a continuation of U.S. patent application Ser. No. 17/656,131, entitled "METHODS AND SYSTEMS FOR 0-PHASE MOTION VECTORS IN 3D GRAPHICS," and filed Mar. 23, 2022. Application Ser. No. 17/656,131 claims priority to Chinese Patent Application No. 202210190985.3, entitled "METHODS AND SYSTEMS FOR 0-PHASE MOTION VECTORS IN 3D GRAPHICS," and filed on Feb. 28, 2022. The entire contents of the above-listed applications are hereby incorporated by reference for all purposes.

FIELD

Embodiments of the subject matter disclosed herein relate to the field of three-dimensional (3D) computer graphics, and in particular how to improve the rendering of interpolated frames within a 3D environment.

BACKGROUND

Over the years, an increase in computer processing power has enabled real-time video rendering, for example for video games or certain animations, to become increasingly sophisticated. For example, whereas early video games featured pixelated sprites moving on a fixed background, contemporary video games feature photorealistic three-dimensional scenes filled with characters. Meanwhile, the miniaturization of processing components has enabled mobile devices, such as handheld video game devices and smartphones, to effectively support real-time rendering of high-frame rate, high-resolution video.

3D graphical video may be output in a variety of different framerates and screen resolutions. It may be desired to convert video with 3D graphics from one framerate (and/or resolution) to another framerate (and/or resolution). In order to save computational power while still increasing the framerate, interpolated frames can be used instead of rendering all frames within a video. Interpolated frames can be effectively generated through the use of motion vectors (also referred to herein as MVs), which track the difference in position of objects between the current frame (CF) and previous frame (PF).

BRIEF DESCRIPTION

Embodiments are disclosed herein for the calculation and transmission of motion vectors in the context of 3D computer graphics. In one example, a method includes generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture, each MV0 determined based on a camera MV0 and an object MV0, and outputting the MV1 texture and the MV0 texture for image processing.

DETAILED DESCRIPTION

Figure 1:
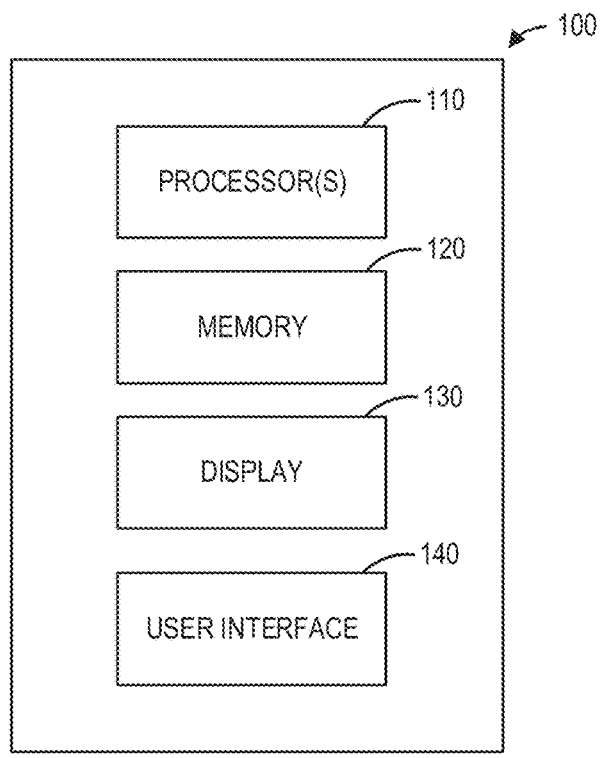
FIG. 1 shows an example diagram of a computing system.

Systems and methods for calculating motion vectors for use in frame interpolation, framerate conversion, or other actions are described herein. As explained previously, motion vectors may be generated which track the difference in position of objects between a current frame (CF) and a previous frame (PF). As explained herein, two types of motion vectors may be utilized to interpolate frames, 1-phase MVs (MV1) and 0-phase MVs (MV0). MV0 represents motion from the PF to the CF and MV1 represents motion from the CF to the PF. The MVs are generated for each pixel (or group of pixels) on the screen, forming a texture, or collection of MVs for the pixels on the screen. As used herein, a texture is defined to be a map from the collection of pixels in a frame to a collection of one or more numbers (e.g. components of a vector or single numbers).

If motion vectors are used in a framerate conversion process, typical rendering engines output only the MV1 texture in two dimensions. As such, the texture contains no depth content, and only includes information about changes in the relative screen positions as viewed in the reference frame of the virtual camera. Utilizing depth for the pixelwise motion vectors may inform how to compute the 2D components of block motion vectors. Block motion vectors may represent an average of the motion vectors for a block of pixels (e.g., a five by five block of pixels) and may be utilized for frame interpolation or other image processing tasks in order to reduce processing demands, for example. Areas of the scene within certain ranges of depth are called foreground (close to the camera), background (far from the camera), or mid-range (between foreground and background). It may be desirable in image processing to determine which depth range dominates each block of pixels: either foreground, background, or mid-range.

As an example, two objects may be positioned at different distances from a (virtual) camera or viewpoint. If the two objects move in the same direction, in equal world-space distances, the object which is farther away may appear to move a smaller distance in the eye space, creating a parallax effect where objects which are farther away from the viewpoint appear to move less than objects that are closer to the viewpoint.

In the case that a majority of pixels in the block are in the background, the majority of pixels will have small MVs, since MVs are evaluated from the perspective of the camera/viewpoint. If a small amount of the pixels in the block are, for example, in the foreground, the foreground pixels will have motion vectors with larger magnitudes. If all motion vectors within the block were to be averaged, the (relatively few) MVs of the foreground would dominate the average MV. This may misrepresent the relatively small apparent motion of the background pixels, favoring the MVs of the foreground pixels instead.

By including the depth information in the pixel MVs, the dominant depth range of each block may be resolved: either foreground, background, or mid-range. Motion vector values within the block which do not fall into the dominant range may then be disregarded in favor of evaluating the average of only the pixels within the dominant range. In the case of a block dominated by background pixels, the resulting motion vector may more closely match the motion occurring within the frame.

Added depth information may also offer additional flexibility for the image processing module. Depth components of the MVs may be used, for example, as an input to a weighting function which may, in turn, be used to apply varying levels of image correction to areas of different depth.

Thus, according to embodiments described herein, a depth texture may be attached to MV1, which allows for more accurate frame interpolation by taking changes in depth into account. In addition, an MV0 texture with depth may similarly be generated. Both MV0 and MV1 can be used as inputs to framerate conversion algorithms, helping in the interpolation step.

In addition, each frame may be composed of two kinds of objects: those with motion vectors and those without. Objects featuring motion vectors may include moving characters or other objects, the view of the user, and parts of an in-game map. Objects without motion vectors may include, for example, smoke effects, full- or partial-screen scene transitions (e.g. fades and wipes), and/or particle effects. By separating objects with motion vectors from objects without motion vectors, improved image processing can be performed. Traditionally, algorithms may attempt to exclude screen regions which feature objects without motion vectors. However, this approach is imperfect and may lead to the blending of nearby objects during the process of framerate conversion. Separation of objects with and without motion vectors before transmission to an image processor may then reduce the artifacts caused by the traditionally-known method of exclusion.

Traditionally, motion vectors are also sampled on a pixel-by-pixel basis, such each pixel on the screen has an associated MV0 and MV1. However, the sampling resolution for motion vectors can be dynamically reduced or increased. Reducing the resolution may also reduce the computational power required for MV calculation. Since many devices (e.g. smartphones) have limited computational resources and battery life, reductions in computational cost may save on processing power and batter life. As described herein, "pixelwise" or "pixel-by-pixel" may not refer to individual pixels, but may instead refer to collections of pixels in the context of evaluating motion vectors. Low-resolution MV generation may be performed, in some embodiments, by lowering the sampling resolution when calculating the MVs. For example, MVs may only be computed for every fourth pixel in the x-direction and every fourth pixel in the y-direction.

The motion vectors described here are first generated on a pixel-by-pixel basis, then translated to a block form with a depth texture. The block motion vectors may then be split into separate channels for objects with motion vectors and objects without to an image processing module. The image processing module may then perform visual enhancements using the block motion vectors, such as framerate conversion, for example.

By separating objects with MVs and objects without MVs, exclusion algorithms may not be necessary. Separation may therefore allow for the generation of interpolated frame data, even in regions obscured by particle effects. Including depth information in the pixel MV may allow for more accurate block MV calculation, since blocks dominated by pixels in the background may be better represented than by taking the block average.

Aspects of the present disclosure are described herein with reference to flowchart illustrations and/or block diagrams of methods, apparatus, and computer program products according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. The described systems are exemplary in nature, and may include additional elements and/or omit elements. The subject matter of the present disclosure includes all novel and non-obvious combinations and sub-combinations of the various systems and configurations, and other features, functions, and/or properties disclosed. Thus, the methods may be performed by executing stored instructions on machine readable storage media with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

FIG. 1 schematically depicts an example of a computer system 100 which may include one or more processors 110 (e.g. central processing units, (CPUs) and/or graphics processing units (GPUs)), volatile and/or nonvolatile memory 120 (e.g. random-access memory (RAM) and/or one or more hard disk drives (HDDs)). The computer system may also include one or more displays, such as display 130, which may comprise any number of visual interface technologies. In addition, example embodiments may include a user interface 140, e.g. keyboards, computer mice, touch screens, controllers, etc. to allow users to provide input to the computer system. In some embodiments, the computer system may be a mobile phone or tablet.

Figure 2:
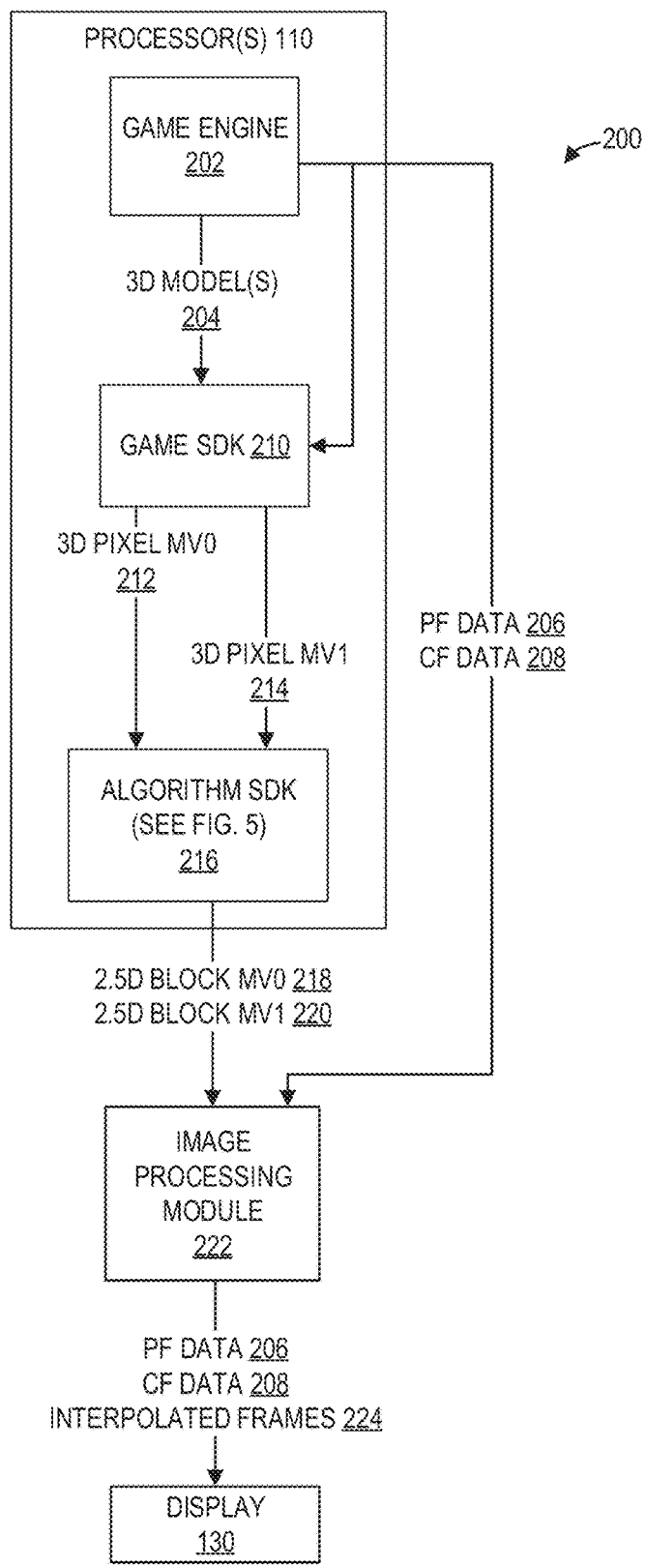
FIG. 2 is an example block diagram schematically illustrating a pipeline for the transmission and usage of motion vector data.

FIG. 2 shows a block diagram 200 schematically illustrating a pipeline for generating and using MVs, including the components that may generate and process MVs. Block diagram 200 includes a game engine 202 which outputs one or more 3D models. The game engine 202 may be configured to generate and output 3D models 204 to be rendered, which may specify the desired locations for objects, and possibly any particle effects. The game engine 202 produces a plurality of image frame data in a sequence, which may include CF data 208 and PF data 206. Ultimately, one or more interpolated frames may be generated between the CF and PF. The 3D models 204 are output to a 3D motion vector module, which in the current example may be a software development kit and thus referring to as a game SDK 210, which uses internal rendering matrices and the information from the 3D models to generate 3D pixel MV0 texture 212 and a 3D pixel MV1 texture 214. The 3D pixel MV1 texture 214 may include a plurality of 3D MV1s, one for each pixel or group of pixels. Each 3D MV1 (e.g., for a respective pixel) may include a change in a vertical position, a change in a horizontal position, and a change in a depth position of an object at that pixel from a current frame to a previous frame. The 3D pixel MV0 texture 212 may include a plurality of 3D MV0s, one for each pixel or group of pixels. Each MV0 (e.g., for a respective pixel) may include a change in a vertical position, a change in a horizontal position, and a change in a depth position of an object at that pixel from the previous frame to the current frame.

The process of generating the 3D pixel MV0 texture 212 and the 3D pixel MV1 texture 214 may include generating a plurality of possible MVs for one or more pixels, due to the non-exclusive projection of the object from PF to the CF. In the 2D domain, one pixel in PF may be projected to a plurality of pixels in the CF. The plurality of possible MVs are then compared to the depth textures and other objects within the 3D scene in order to double-confirm the MVs. Double-confirmation is a process of selecting the correct MV from the plurality of MVs. One example method is to compare the depth buffers of the 3D pixel MV0 212 and the 3D pixel MV1 214 to the depth textures of PF and the CF, respectively.

The (double-confirmed) 3D pixel MV0 texture 212 and the (double-confirmed) 3D pixel MV1 texture 214 may then be output to a block motion vector module, which in the current example may be a software development kit and thus may be referred to as an algorithm SDK 216, which may process the input to generate 2.5D block texture MV0 218 and a 2.5D block MV1 texture 220, which are textures that may be utilized in generating interpolated frames. The block textures are generated from a process which averages the motion vector values within each of a plurality of blocks (as explained below with respect to FIG. 5). The 2.5D block MV0 texture 218 and the 2.5D block MV1 texture 220 are output to an image processing module 222, which may or may not be a piece of hardware separate from the other processors 110, which also receives the CF data 208 and the PF data 206. During the transfer of the 2.5D block MV0 texture 218 and the 2.5D block MV1 texture 220, objects with MVs are separated from objects without MVs. The separated data may be transmitted on two physically separated or two logically separated channels to the image processing module 222.

The image processing module 222 may then perform an interpolation step or a framerate conversion, using the 2.5D block MV0 texture 218 and the 2.5D block MV1 texture 220 as inputs, as well as the PF data 206 and CF data 208. The image processing module 222 may output PF data 206, one or more interpolated frames 224, and CF data 208, which may then be visually displayed (in the order listed) on display 130. Generating the interpolated frame 224 therefore allows for the framerate to be increased.

The game engine 202, the game SDK 210, and the algorithm SDK 216 may each execute on the same processors 110 of the computer system 100 or on different processors according to instructions stored in volatile and/or nonvolatile memory 120. The image processing module 222 may be a separate piece of hardware than the game engine 202, the game SDK 210, and the algorithm SDK 216, at least in some examples.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

It should be noted that the techniques discussed herein apply not only to games, but to any animated renderings of 3D models, though the advantages offered by this method may be most noticeable in real-time rendering situations.

Figure 3:
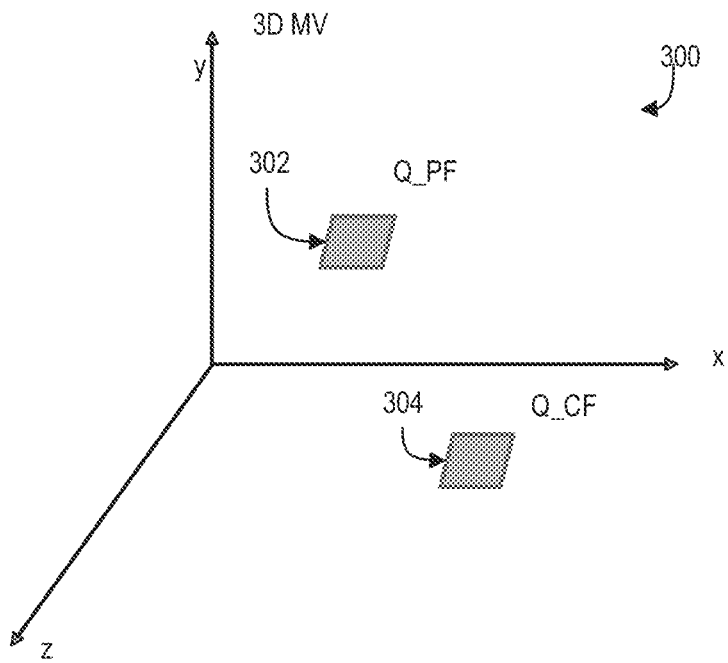
FIG. 3 shows an example 3D coordinate system and two points in 3D space.

FIG. 3 shows a 3D coordinate system 300 with two three-dimensional points Q_PF 302 and Q_CF 304. Both points have x, y, and z coordinates, with Q_PF 302 having coordinates of $(x_0, y_0, z_0)$ and Q_CF having coordinates of $(x_1, y_1, z_1)$. The z value is also known as the depth, which, in some examples, is provided by a separate texture or may need to be calculated using, for example a method involving a ray going from the camera location to the points' locations. From these two points in space, two 3D motion vectors may be calculated using, for example, $$MV0 = (x_0 - x_1, y_0 - y_1, z_0 - z_1) = (\Delta x_0, \Delta y_0, \Delta z_0),$$

$$MV1 = (x_1 - x_0, y_1 - y_0, z_1 - z_0) = (\Delta x_1, \Delta y_1, \Delta z_1) = -MV0.$$

According to these definitions, MV0 represents the 3D change experienced by an object going from the Q_PF 302 to Q_CF 304. On the other hand, MV1 represents a change in the opposite direction: from Q_CF 304 to Q_PF 302.

Although the 3D motion vectors of FIG. 3 show points in 3D space, these points are projected onto a 2D display in order to be viewed. In conventional examples, the motion vectors are generated as a 2D texture, which is then used to generate visual enhancements and create interpolated frames. The embodiments described herein use a depth texture in addition to the conventional MV information, but in a distinct way from a purely 3D MV. This depth texture can be calculated, for example, by projecting a ray from the near clip of the viewing space to the object of each pixel, allowing depth to be evaluated for each point on the screen. The near clip, as defined herein, is the closest plane of the 3D space in which objects are still visible. Objects closer than the near clip are not visible in the scene.

Thus, the method of calculating 3D MV0s and 3D MV1s may be applied to generate the 3D pixel MVs discussed above with respect to FIG. 2, which are then double-confirmed according to a process described in more detail below. The double-confirmed 3D pixel MV0s and double-confirmed 3D pixel MV1s may be converted to 2.5D block MV0s and 2.5D block MV1s which are then output to an image processing module for use in framerate conversion, for example.

Figure 4:
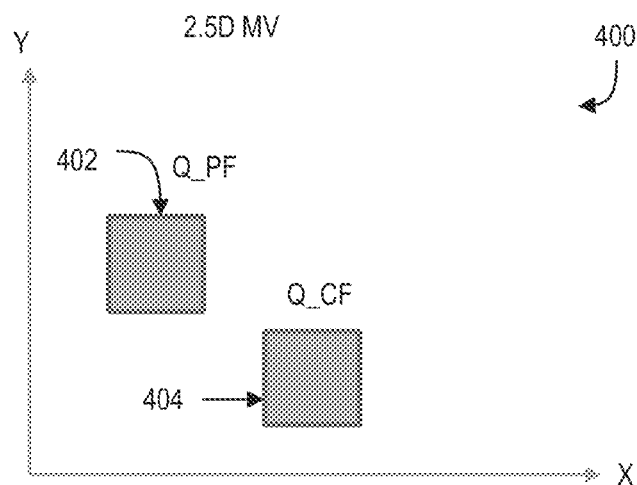
FIG. 4 shows an example 2D coordinate system and two points in 2D space.

FIG. 4 illustrates how 2.5D motion vectors may be calculated and thus shows a 2D coordinate system 400 with the projection of Q_PF 402 and the projection of Q_CF 404. These projected points have only x- and y-coordinates. Projections may be performed through the use of rendering matrices applied to points in 3D space, such as the rendering matrices discussed above with respect to FIG. 2. The 2D coordinate system 400 may represent, for example, the apparent positions of pixels on a 2D screen, as viewed from the perspective of a virtual camera. Using the projected coordinates and the depth values of the two points, the 2.5D motion vectors can be calculated. Note that these are distinct from the 3D motion vectors. The 2.5D motion vectors may be computed as, for example, $$MV0_{2.5D}=(\Delta x_0, \Delta y_0, z_0),$$

$$MV1_{2.5D}=(\Delta x_1, \Delta y_1, z) \neq -MV0_{2.5D}.$$

Note that the change in depth between the frames is not recorded in either case, and that the raw depth values $z_1$ and $z_0$ are used.

Figure 5:
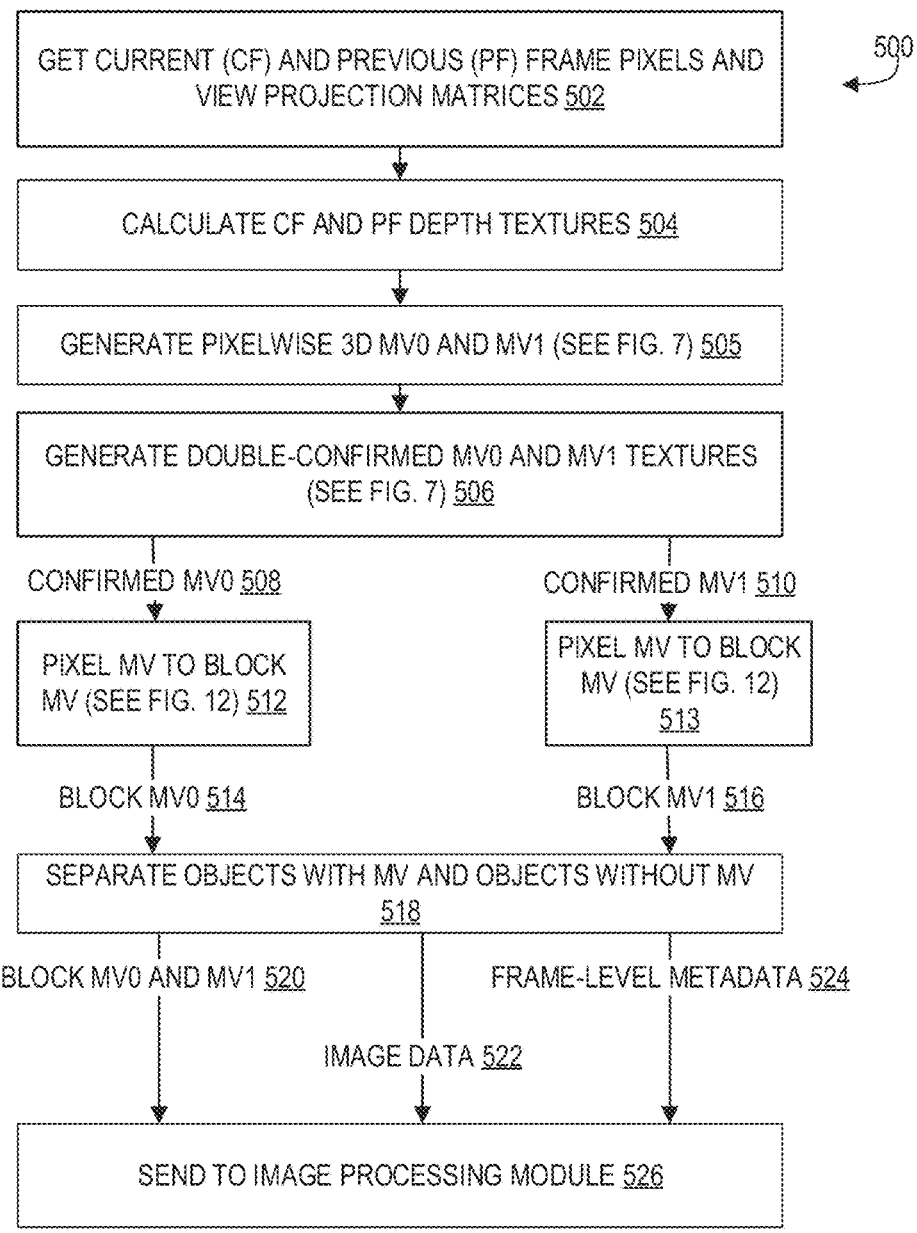
FIG. 5 shows a flowchart illustrating an example method for creating a 2.5D block MV0 and a 2.5D block MV1, along with output to an image processing module.

FIG. 5 shows a flowchart for a method 500 for generating 2.5D block motion vectors. Method 500 may be carried out according to instructions stored in computer memory, such as volatile and/or nonvolatile memory 120, and executed on one or more processors, such as processors 110. In some examples, method 500 may be carried out by the game SDK 210 and/or the algorithm SDK 216 of FIG. 2. At 502, CF and PF frame pixels and view projection matrices (e.g., rendering matrices) are acquired. In some examples, the CF and PF frame pixels and view projection matrices are received from the game SDK 210 or the game engine 202. The depth textures of CF and PF are calculated at 504. The depth textures may include a change in depth of a respective object for each pixel from the CF to the PF (for the MV1 texture) and a change in depth of a respective object for each pixel from the PF to the CF (for the MV0 texture). At 506, a double-confirmation process is applied to double-confirm each 3D pixel MV1 and MV0 of the textures. Double confirmation selects the correct motion vectors from one or more possible choices, depending on factors such as occlusion of pixels and may help to render more accurate motion vectors. To double-confirm an MV1 or MV0 for a selected pixel, the method may confirm that the coordinates of the selected pixel in the current frame match coordinates of that pixel mapped back to the previous frame using the MV1 or MV0 for the selected pixel, where the coordinates of the selected pixel include a depth coordinate. For example, in the 2D domain, one pixel in PF could be projected by several pixels in CF. In the 3D domain, there is a one-to-one correspondence for each pixel. The depth buffer may then be used to decide which MV is correct:

Depth_buffer[i]=cf_mv_z_i+depth_i;if
 Depth_PF=Depth_buffer[j],then buffered MV_j
 is correct MV0.

Additionally or alternatively, a MV of a pixel in PF (with coordinates X0,Y0,depth0) is (delta_x0, delta_y0, delta_z0). The corresponding pixel in CF may have coordinates (X1, Y1,depth1) If X1=X0+delta_x; Y1=Y0+delta_y; and depth1=depth0+delta_z, then this pixel is called double confirmed. Put another way, if the MV of a pixel in CF (with coordinates X1, Y1, depth1) is (delta_x1, delta_y1, delta_z1), if delta_x0=−delta_x1, delta_y0=−delta_y1, and delta_z0=−delta_z1, the pixel Q_CF and Q_PF are double-confirmed. Anything that is not double-confirmed is outside a double-confirmed region.

If a pixel/MV is determined to be in an unconfirmed region, any non-confirmed MV1s and/or MV0s may be adjusted based on a nearest double-confirmed MV1 and/or MV0 (or nearest double-confirmed MV1 or MV0 of the same object) to transform the one or more non-confirmed MV1s and/or MV0s into one or more double-confirmed MV1s and/or MV0s. For example, for a given pixel P0, the nearest pixel with a double-confirmed MV may be PF. To adjust the MV for P0, the MV0 for P0 may be the sum of the MV1 for PF and a delta MV for PF. The delta MV for PF may be calculated as MV0 for PF plus MV1 for P0. The double confirmed 3D pixel MV0s may be output at 508 and the double-confirmed 3D pixel MV1s may be output at 510 (e.g., to the algorithm SDK). Using the double-confirmed 3D pixel MV0s, a 2.5D block MV0 is generated at 512 and the 2.5D block MV0 is output at 514. Similarly, the double-confirmed 3D pixel MV1s are converted to a block MV1 at 513 and the block MV1 is output at 516. To convert the 3D pixel MV1s to 2.5D block MV1s, for each pixel block of a plurality of pixel blocks, a predominant pixel type in that pixel block is identified. If the predominant pixel type is background pixels, an average MV1 is calculated over all pixels in that pixel set. Otherwise, the average MV1 is calculated over only foreground pixels in that pixel set. The average MV1 is then set as the MV1 for that pixel block, wherein the set of MV1 blocks comprises the average MV1 for each pixel block. A similar process may be performed for the conversion of the 3D pixel MV0s to 2.5D block MV0s. Further, rather than include the change in depth in the MVs, the change in depth is replaced with the depth value for that pixel. The 3D MVs represent motion of objects between frames in three dimensions. 2.5D MVs represent motion of objects within the 2D screen, with a depth value added to represent occlusion of objects. That is, the depth value represents which objects are in front of others, which may help in the generation of interpolated frames.

At 518, objects with MVs and objects without MVs are separated into two channels. In some embodiments, the channels are physically separate. When physically separate channels are infeasible, logically separate channels (either in space or in time) may be used. Separating the objects with MVs from objects without MVs may remove the need to exclude regions from the screen when performing framerate conversion. Exclusion algorithms may produce visual artifacts at the boundaries of regions with particle effects. Separating these objects allows them to be processed differently, improving the result.

Various information is sent to the image processing module at 526. The information that is sent to the image processing module includes block MV0 and MV1, as indicated at 520, as well as image data, as indicated at 522, and frame-level metadata, as indicated at 524. The image data 522 may include the objects discussed above and thus the image data 522 may be sent over more than one physical or logical channel.

Figure 6A:
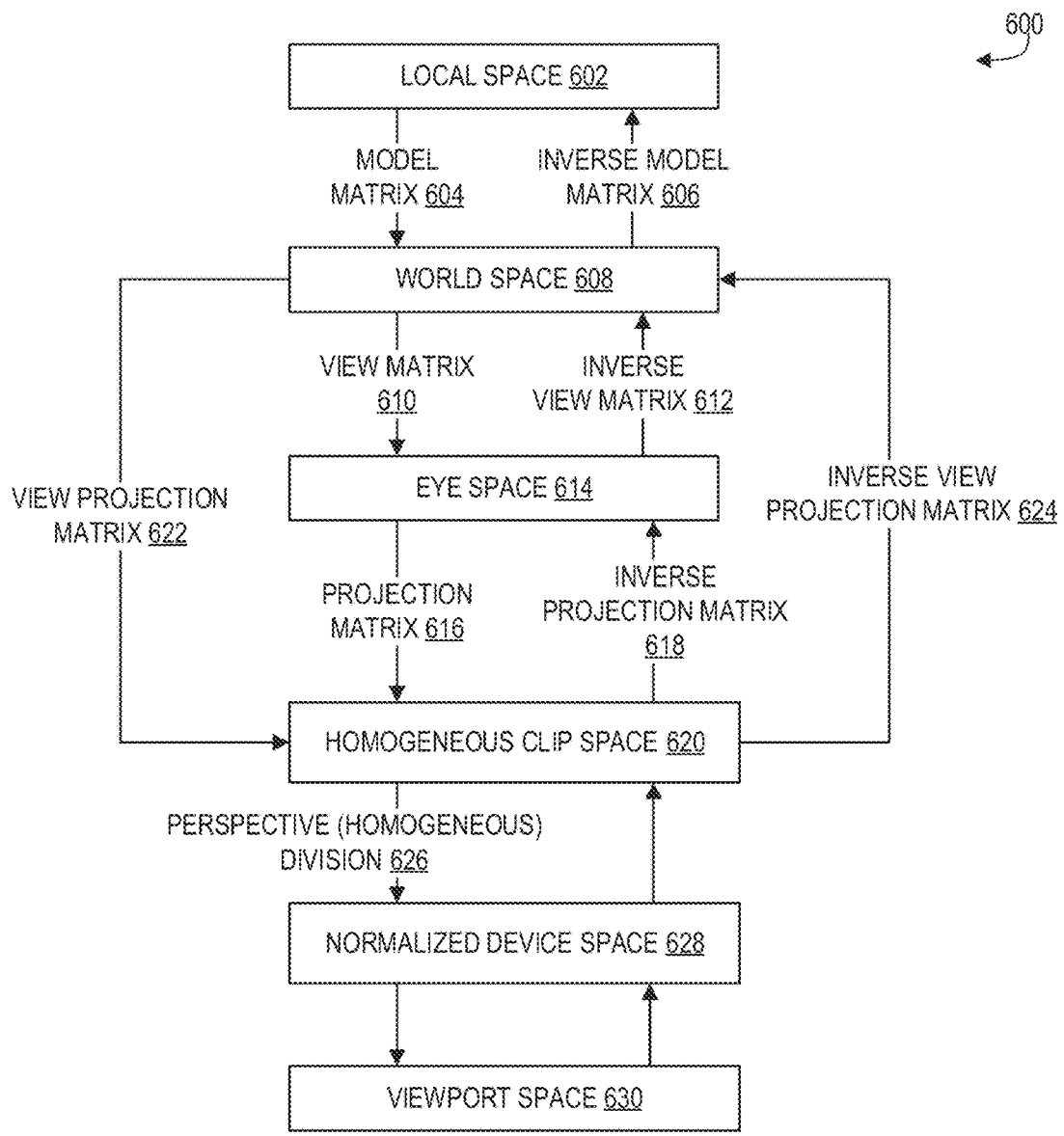
FIG. 6A shows a flowchart diagram of an example rendering pipeline, its internal spaces, and the transformations between spaces.

FIG. 6A shows an example diagram of a rendering pipeline 600 executed on a game engine, such as game engine 202 of FIG. 2. As referred to herein, a rendering pipeline is a set of internal spaces within the game engine which provide 3D rendering data in different forms. The rendering pipeline 600 illustrates a process for rendering a 3D scene to a 2D screen. The 3D scene may be based on a 3D model created as part of a video game or other 3D animation, such that the rendering pipeline 600 depicts the process of turning the 3D model into 2D frames for display on a display device. At least some of the information from the rendering pipeline (e.g., the rendering matrices and depth textures) may be output to the game and/or algorithm SDKs for use in calculating motion vectors, as explained in more detail below. The rendering pipeline 600 starts with data represented in a local space 602, which specifies the locations of vertices in a 3D model relative to an origin of the 3D model. The local space 602 therefore captures the geometry of the 3D model and may also be referred to as model space. The 3D model may include one or more objects (e.g., characters, buildings, etc.) represented as meshes each having a local origin. Using a model matrix 604, the 3D model may be embedded within a world space 608, which may represent the locations of the objects in the 3D model relative to an origin within a 3D world. The 3D world may be a virtual world, e.g., the 3D world of the game. The term "matrix," as used herein, refers to any collection of numbers indexed by two natural numbers. The matrices discussed herein are all nonsingular, so inverses may be computed for each matrix.

Objects in the world space 608 may be transformed to an eye space 614 via a view matrix 610. Eye space positions represent the apparent locations of 3D objects, relative to a virtual camera positioned at an origin of the eye space 614. In this way, via the eye space 614, the objects in the world space may be viewed from a particular camera location. A projection matrix 616 maps the points in the eye space 614 to a homogeneous clip space 620. The homogeneous clip space 620 may represent locations within a square-pyramid shaped view frustum, and thus the projection matrix may scale the xyz locations of the eye space into the frustum shape.

Figure 6B:
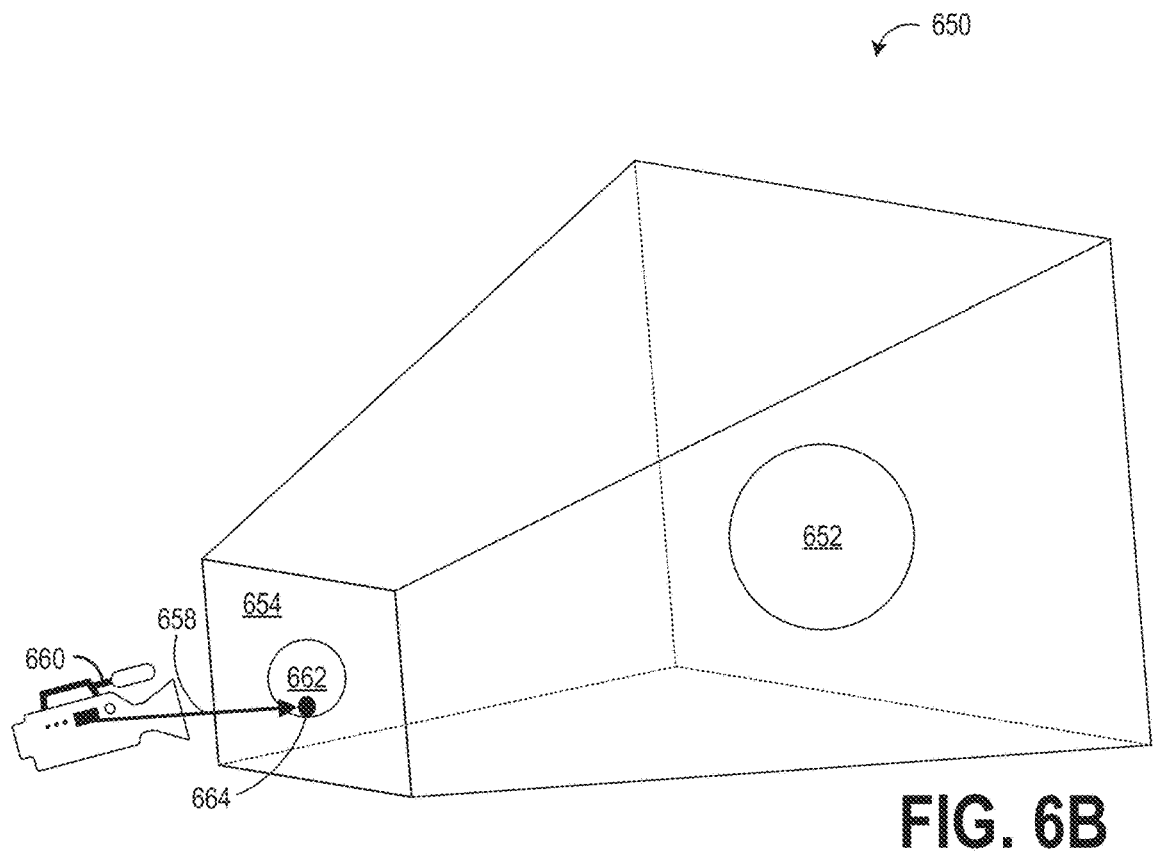
FIG. 6B shows an example of a view frustum within a 3D digital scene including a near clip.

FIG. 6B shows a view frustum 650, acting as the visible region of the 3D scene. The coordinate system in the view frustum 650 space has a virtual camera 660 at the origin, which represents the perspective of the viewer. One or more objects 652 may be represented in the view frustum 650. In order to produce a 2D view of the scene, objects are projected to the near clip 654. For example, if object 652 is a sphere, its projection 662 may be a circle. The screen may comprise an array of pixels, with each pixel corresponding to one or more objects within the scene. For example, the 3D object 652 is represented by its projection 662 on the near clip 654. Pixel 664 represents a location on the near clip 654 corresponding to the projection 662. Computing the eye space position of an object involves drawing a ray 658 from the origin at the virtual camera 660 to each point on the projected object, such as pixel 664. The ray, which may be a vector quantity with one or more values described in further detail below, is multiplied by the linear depth information from the game engine. The resulting ray may have a magnitude and direction reflective of the world space position of the object.

Figure 6C:
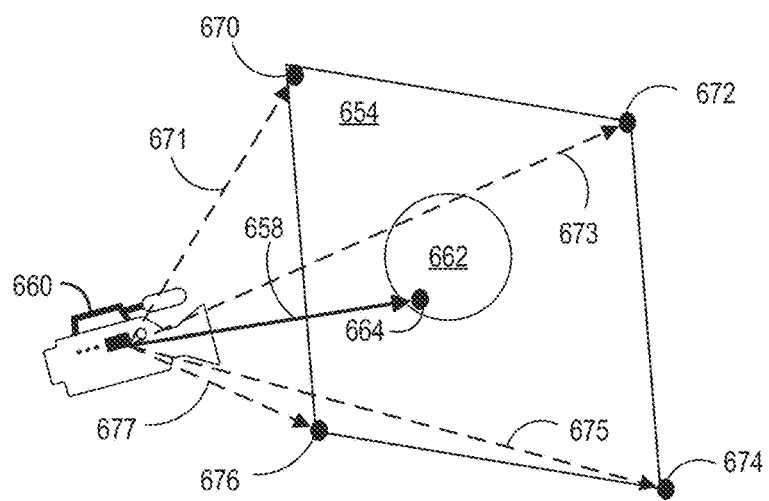
FIG. 6C shows an enlarged view of the near clip of FIG. 6B.

FIG. 6C shows an enlargement of the near clip 654, with the virtual camera 660 at the origin of the space. Corner 670, corner 672, corner 674, and corner 676 represent the corners (starting from the upper-left and going clockwise) of the near clip 654. Rays may be drawn from the origin (e.g., virtual camera 660) to each of the corners. The corner ray of corner 670 is ray 671, the corner ray of corner 672 is ray 673, the corner ray of corner 674 is ray 675, and the corner ray of corner 676 is ray 677. The ray 658 representing pixel 664 may be chosen to be the corner ray associated with the nearest corner of the near clip 654 (e.g., the corner nearest pixel 664). For example, if pixel 664 is located in the lower left quadrant of the near clip 654, it would be closest to corner 676, so the ray 677 would represent the corner ray of pixel 664. Determination of the corner ray, e.g. ray 677, may be performed in a vertex shader. The ray 677 is then interpolated using a rasterization algorithm, yielding the ray 658, which points from the virtual camera 660 to the pixel 664. The ray 658 may be interpolated based on the relative positions of the virtual camera 660 and the pixel 664.

Turning back to FIG. 6A, composing (e.g. multiplying) the view matrix 610 with the projection matrix 616 yields a view projection matrix 622, which transforms positions in the world space 608 to the homogeneous clip space 620 directly (e.g., without forming an intermediate eye space 614).

To transform from the homogeneous clip space 620 to a normalized device space 628, homogeneous division 626 may be performed. In computer graphics, positions may be represented with four-dimensional vectors (collections of numbers indexed by a single natural number). In many examples, the first three coordinates may constitute the x, y, and z (depth) values of the position. The fourth coordinate may then represent the scale factor (or w) value, as used in projective geometry, which is applied to scale the eye space locations to the frustum shape of the homogenous clip space. Perspective division is the process of normalizing a four-dimensional vector by dividing all entries by the w-value (therefore creating a "correct" position vector with w=1). The final step in the rendering pipeline 600 is the transformation to a viewport space 630. This involves projecting onto the specific display device (such as display 130) being used to show the 3D scene. The final projection to the viewport space 630 creates a 2D image to be displayed on the screen (e.g., display 130), with the x,y locations of the normalized device space being preserved and the z locations being applied to sort (e.g., resize) the objects to give the appearance of depth on the 2D image.

Inverses processes of aspects of the rendering pipeline 600 may be performed in order to perform certain actions, such as mapping user input device pointer (e.g., mouse pointer) location to a particular object, and may also be used to generate MV0s, as will be explained below. For example, an inverse view projection matrix 624 may be obtained by multiplying an inverse projection matrix 618 (applied to transform the homogeneous clip space 620 back to the eye space 614) by an inverse view matrix 612 (applied to transform the eye space 614 back to the world space 608). Further, an inverse model matrix 606 may be applied to transform objects in the world space 608 to the local space 602.

Figure 7A:
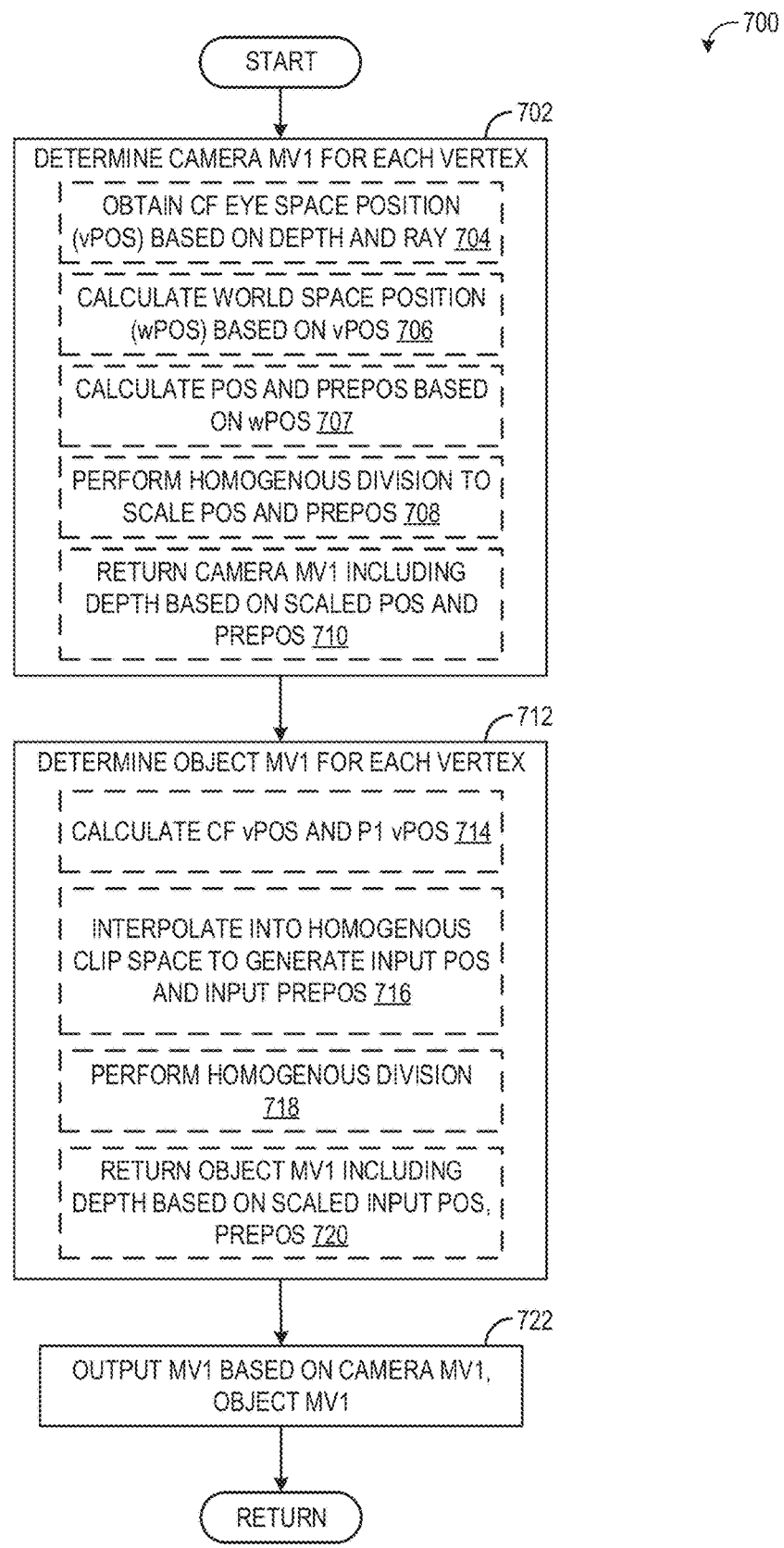
FIGS. 7A and 7B show example methods for generating MV1s and MV0s, respectively.
Figure 7B:
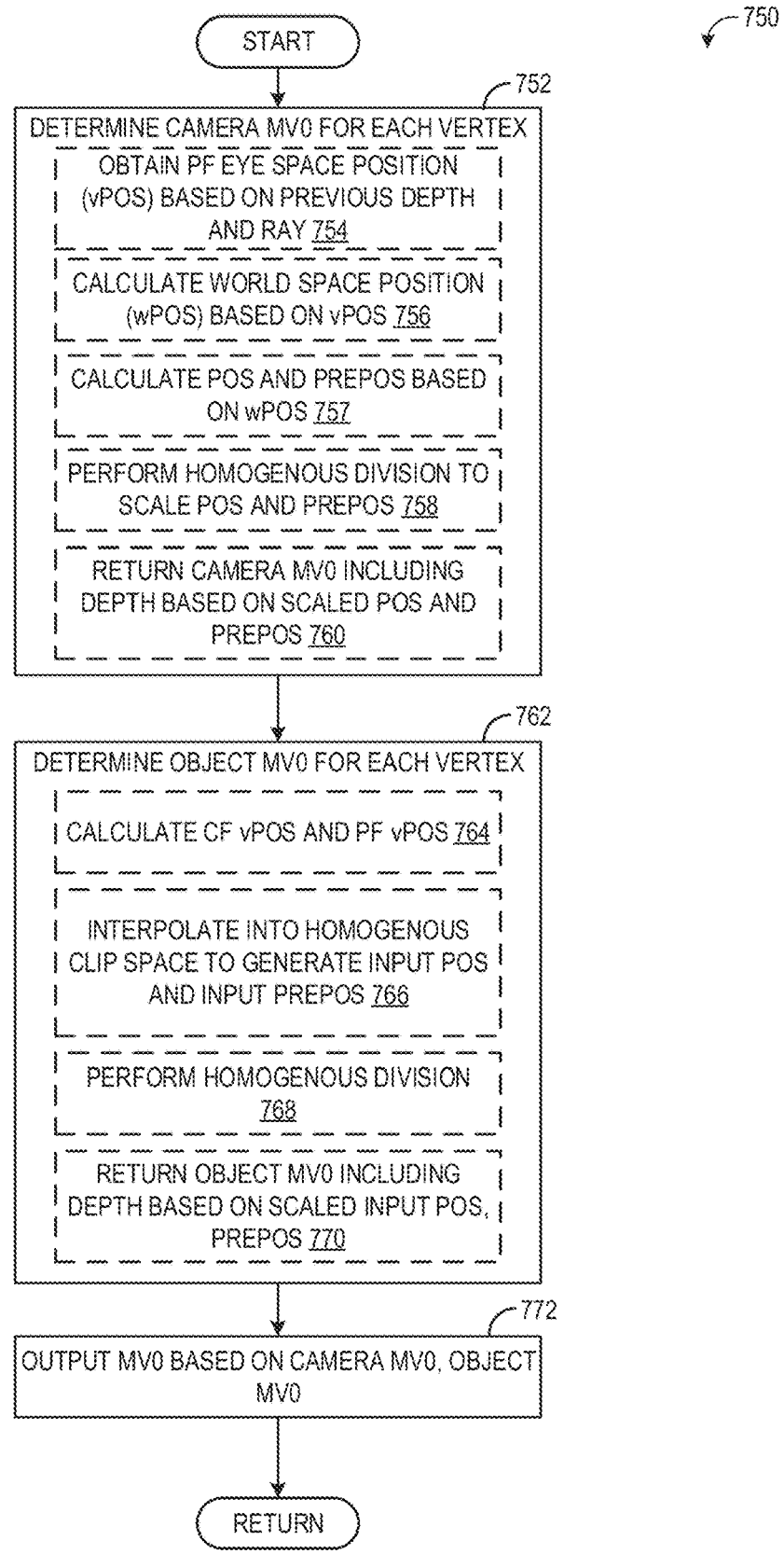

FIGS. 7A and 7B show a method 700 and a method 750 for generating pixelwise MV1 and MV0 textures, respectively. Methods 700 and 750 create MVs which are sums of object motion vectors and camera motion vectors. Method 700 and method 750 may be performed as part of method 500, for example in order to generate the pixelwise MV0 and MV1 textures at step 505 of method 500. The textures created by method 700 and method 750 may be either 2.5D or fully 3D, with method 700 being adjustable to generate either one. The generation of the pixelwise MV0s and MV1s may be performed for each pixel or group of pixels on the screen/2D image that will be displayed, and method 700 and method 750 are described herein as generating an MV1 and an MV0, respectively, for a selected pixel or group of pixels. It will be appreciated that the processes of method 700 and method 750 may be applied to each vertex within a frame, then the pixelwise MV0 and the pixelwise MV1 textures may be generated by finding pixel locations corresponding to each of the vertices. Lowering the sampling resolution of the MVs may result in vertices being assigned to groups of pixels rather than individual pixels. For example, MVs may be assigned within 2×2 collections of pixels.

Referring first to method 700, it includes at 702, determining a camera MV1 for each vertex of the current frame. The camera MV1 may represent the motion of a vertex of an object within the current frame (CF) to the previous/last frame (PF) due to a change in the position of the virtual camera. To determine the camera MV1, the world space position of a selected vertex is calculated and the motion vector is computed from the world space position. Thus, determining the camera MV1 for the selected vertex includes obtaining a CF eye space position (vPos) based on a depth and a ray for the selected vertex, as indicated at 704. In order to obtain the world space position of the selected vertex, the eye space position of that vertex is first determined. The eye space position is calculated from the depth value of the selected vertex as sampled from a depth buffer (e.g., stored depth texture) generated by the game engine, where the depth buffer stores the non-linear depth information for each vertex. The xy screen position of the selected vertex is used to sample the depth buffer. The ray is a vector from the origin (e.g., the virtual camera position) to that vertex on the near clip of the view frustum, as explained above. The vPos may be a position in xyz of the eye space determined by multiplying the depth by the ray.

At 706, a world space position (wPos) of the vertex is calculated based on the vPos. Using the vPos of the vertex, the position in world space of that vertex may be determined. To calculate the wPos, the vPos determined at 706 is multiplied by an inversed view matrix (such as the inverse view matrix 612 of FIG. 6A), which is the inverse of the view matrix used to transform the world space positions to the eye space positions, as explained above with respect to FIG. 6A. The inversed view matrix may be obtained from the game engine. At 707, a position (Pos) of the vertex in the homogenous clip space of the current frame is determined and a previous position (Prepos) of the vertex in the homogenous clip space of the previous frame are determined based on the wPos. To determine the Pos, the wPos is multiplied by the view matrix (generated/output by the game engine). To determine the Prepos, the wPos is multiplied by the view matrix of the previous frame. The view matrix of the previous frame may be generated/output by the game engine during the generation/rendering of the previous frame and may be cached for use in calculating the camera MV1. The view matrix of the current frame may be cached for use in calculating the camera MV1 of the next frame.

At 708, a homogenous division is performed to scale the Pos and the Prepos, such that xyz positions in the current and previous homogenous clip space are normalized by the scaling factor (w). In some examples, scaling results in values of Pos and Prepos being in the [−1,1] range. At 710, the camera MV1 is returned based on the scaled Pos and Prepos. The MV1 may include a velocity that is calculated as the Pos minus the Prepos, in the x, y, and z axes. In some examples, the velocity may be multiplied by 0.5 to get the motion vector in the [0,1] range. Further, the depth value in the normalized device space (e.g., after scaling) of the current frame is also included as part of the camera MV1. The camera MV1 may thus include the change in position of that pixel (in x, y, and z) from the current frame to the previous frame and a depth value of that vertex in the current frame. The vertices within the frame may be assigned pixel values based on where they appear in the xy screen space. Note that if the sampling resolution is lowered, the pixel assigned to each vertex for the purposes of MV generation may not be exactly the closest pixel.

Note that the camera MV1 calculation assumes that the selected vertex of the object did not move from the previous frame to the current frame, since the same wPos is used. For moving objects, the wPos will not be the same in the previous frame and the current frame. Accordingly, an object motion vector (object MV1) is also determined for each vertex, as indicated at 712. To determine the object MV1, the eye space position of each vertex in the current frame (CF vPos) and the eye space position of each vertex in the previous frame (PF vPos) are determined at 714. The eye space position for each vertex of the current frame is determined by multiplying each vertex's current frame position in the model/local space by the model matrix, and then multiplying that product by the view projection matrix. The eye space position for each vertex of the previous frame is determined by multiplying each vertex's previous frame position in the model/local space (which is obtained by caching the vertex's current frame position in a prior MV1 calculation, e.g., going from the frame before PF to PF) by the previous frame model matrix, and then multiplying that product by the previous frame view projection matrix, which is also cached (e.g., from the prior MV1 calculation).

At 716, the CF vPos and the PF vPos are interpolated into the homogenous clip space to generate an input Pos and an input Prepos. Thus, the eye space positions are interpolated into the homogenous clip space. For each fragment, a homogenous division is performed, as indicated at 718, to generate a scaled input Pos and a scaled input Prepos (e.g., normalized based on the scale factor w) in the normalized device space. The scaled input Pos and scaled input Prepos may each include xyz values. At 720, the object MV1 for the selected pixel is returned based on the scaled input Pos and scaled input Prepos for the selected vertex. The object MV1 may include a velocity that is calculated as the input Pos minus the input Prepos, in the x, y, and z axes. In some examples, the velocity may be multiplied by 0.5 to get the motion vector in the [0,1] range. Further, the depth value in the normalized device space (e.g., after scaling) of the current frame is also included as part of the object MV1. The object MV1 may thus include the change in position of that vertex (in x, y, and z) from the current frame to the previous frame and a depth value of that vertex in the current frame.

At 722, the MV1 for that pixel is output based on the camera MV1 and the object MV1. Step 722 includes finding the pixel associated with the vertex, for the purposes of generating the MV1 texture. The pixel selected for each vertex may also depend on the sampling resolution of the motion vectors. The camera MV1 and the object MV1 may be summed to produce the MV1. Method 700 returns.

Referring next to method 750, it includes at 752, determining a camera MV0 for each vertex within the current frame. The camera MV0 may represent the motion of a vertex within that object from the previous/last frame (PF) to the current frame (CF) due to a change in the position of the virtual camera. To determine the camera MV0, the world space position of a selected vertex in the previous frame is calculated and the motion vector is computed from the world space position. Thus, determining the camera MV0 for the selected vertex includes obtaining a PF eye space position (vPos) based on a previous depth and a ray for the selected vertex, as indicated at 754. In order to obtain the previous frame world space position of the selected vertex, the eye space position of that vertex in the previous frame is first determined. The PF eye space position is calculated from the previous depth value of the selected vertex as sampled from a previous frame depth buffer generated by the game engine, where the previous frame depth buffer stores the non-linear depth information for each vertex. The xy screen position of the selected pixel is used to sample the previous depth buffer. The ray is a vector from the origin (e.g., the virtual camera position) to that vertex on the near clip of the view frustum, as explained above. The vPos may be a position in xyz of the eye space determined by multiplying the previous depth by the ray.

At 756, a world space position (wPos) of the vertex is calculated based on the vPos. Using the vPos of the vertex, the position in world space of that vertex may be determined. To calculate the wPos, the vPos determined at 756 is multiplied by an inversed view matrix of the previous frame. The inversed view matrix may be initially obtained from the game engine and then cached (e.g., the previous frame's camera to world matrix is cached and then obtained to determine the wPos). At 757, a position (Pos) of the vertex in the homogenous clip space of the current frame is determined and a previous position (Prepos) of the vertex in the homogenous clip space of the previous frame are determined based on the wPos determined at 756. To determine the Pos, the wPos is multiplied by the view matrix (generated/output by the game engine). To determine the Prepos, the wPos is multiplied by the view matrix of the previous frame. The view matrix of the previous frame may be generated/output by the game engine during the generation/rendering of the previous frame and may be cached for use in calculating the camera MV0. The view matrix of the current frame may be cached for use in calculating the camera MV0 of the next frame.

At 758, a homogenous division is performed to scale the Pos and the Prepos, such that xyz positions in the current and previous homogenous clip space are normalized by the scaling factor (w). At 760, the camera MV0 is returned based on the scaled Pos and Prepos. The MV0 may include a velocity that is calculated as the Pos(xyz) minus the Prepos (xyz), in the x, y, and z axes. In some examples, the velocity may be multiplied by 0.5 to get the motion vector in the [0,1] range. Further, the depth value in the normalized device space (e.g., after scaling, such that the depth value is the z value of the Prepos(xyz)) of the previous frame is also included as part of the camera MV0. The camera MV0 may thus include the change in position of that pixel (in x, y, and z) from the previous frame to the current frame and a depth value of that pixel in the previous frame.

Note that the camera MV0 calculation assumes that the selected vertex of the object did not move from the previous frame to the current frame, since the same wPos is used. For moving objects, the wPos will not be the same in the previous frame and the current frame. Accordingly, an object motion vector (object MV0) is also determined for each vertex, as indicated at 762. To determine the object MV0, the eye space position of each vertex in the current frame (CF vPos) and the eye space position of each vertex in the previous frame (PF vPos) are determined at 764, similar to the eye space position determination performed when calculating the object MV1. The eye space position for each vertex of the current frame is determined by multiplying each vertex's current frame position in the model/local space by the model matrix, and then multiplying that product by the view projection matrix. The eye space position for each vertex of the previous frame is determined by multiplying each vertex's previous frame position in the model/local space (which is obtained by caching the vertex's current frame position in a prior MV0 calculation, e.g., going from the frame before PF to PF) by the previous frame model matrix, and then multiplying that product by the previous frame view projection matrix, which is also cached (e.g., from the prior MV0 calculation).

At 766, the CF vPos and the PF vPos are interpolated into the homogenous clip space to generate an input Pos and an input Prepos. Thus, the eye space positions are interpolated into the homogenous clip space. For each fragment, a homogenous division is performed, as indicated at 768, to generate a scaled input Pos and a scaled input Prepos (e.g., normalized based on the scale factor w) in the normalized device space. The scaled input Pos and scaled input Prepos may each include xyz values. At 770, the object MV0 for the selected vertex is returned based on the scaled input Pos and scaled input Prepos for the selected vertex. The object MV0 may include a velocity that is calculated as the input Pos(xyz) minus the input Prepos(xyz), in the x, y, and z axes. In some examples, the velocity may be multiplied by 0.5 to get the motion vector in the [0,1] range. Further, the depth value in the interpolated homogenous clip space (e.g., after scaling) of the previous frame is also included as part of the object MV0 (e.g., the z value of the input Prepos(xyz)). The object MV0 may thus include the change in position of that vertex (in x, y, and z) from the previous frame to the current frame and a depth value of that vertex in the previous frame. The vertex may then be ascribed a pixel (or group of pixels) based on the vertex's position on the screen and the sampling rate of the motion vectors.

The object MV0 may thus include the change in position of that pixel (in x, y, and z) from the previous frame to the current frame and a depth value of that pixel in the previous frame.

At 772, the MV0 for that pixel is output based on the camera MV0 and the object MV0. Step 772 includes finding the pixel associated with the vertex, for the purposes of generating the MV0 texture. The pixel selected for each vertex may also depend on the sampling resolution of the motion vectors. The camera MV0 and the object MV0 may be summed to produce the MV0. Method 750 returns.

Figure 8:
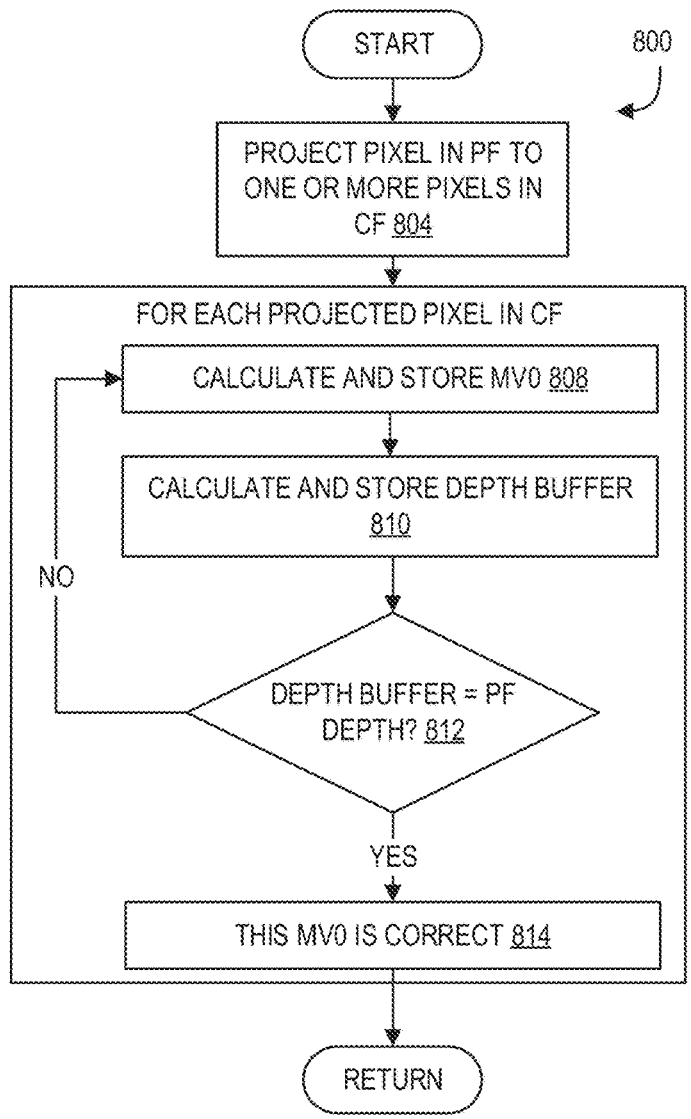
FIG. 8 shows an example method for determining the correct MV0, given a plurality of MV0 values as input.

FIG. 8 shows a method 800 for choosing a correct MV0 from a plurality of possible MV0 inputs. Choosing the correct MV0 may be used alone, or in addition to, a double-confirmation process. When a current frame pixel Q_CF and a previous frame pixel Q_PF are double confirmed, the values of the MVs of Q_CF and Q_PF have the same magnitudes but opposite signs. This property may improve the interpolated pixel represented generated between the CF and PF. Depth can represent the occlusion relationship between objects. When projecting from CF to PF, several pixels may be projected to the same location. A depth buffer can help to select which MVs are double confirmed.

Method 800 may resolve the correct motion vector in the 2D domain, as projecting from PF to the CF may have several possible resulting pixels. The method 800 takes as input a depth value and begins at 804 where a pixel in PF is projected to a plurality of pixels in the CF. For each pixel in the CF, the potential MV0 is calculated and stored at 808. Next, the depth buffer is calculated at 810 by, for example, DepthBuffer=$MV1_z$+Depth, where $MV1_z$ is the z-component of the 3D MV1 and Depth refers to the depth texture value in the current frame.

The PF depth may be compared to the PF depth at 812. If the depth buffer of this pixel matches the PF depth of the pixel, the MV0 corresponding to the PF pixel is correct, as indicated 814, and is returned. If the MV0 is not correct, the loop continues with the other possible projected pixels.

Figure 9A:
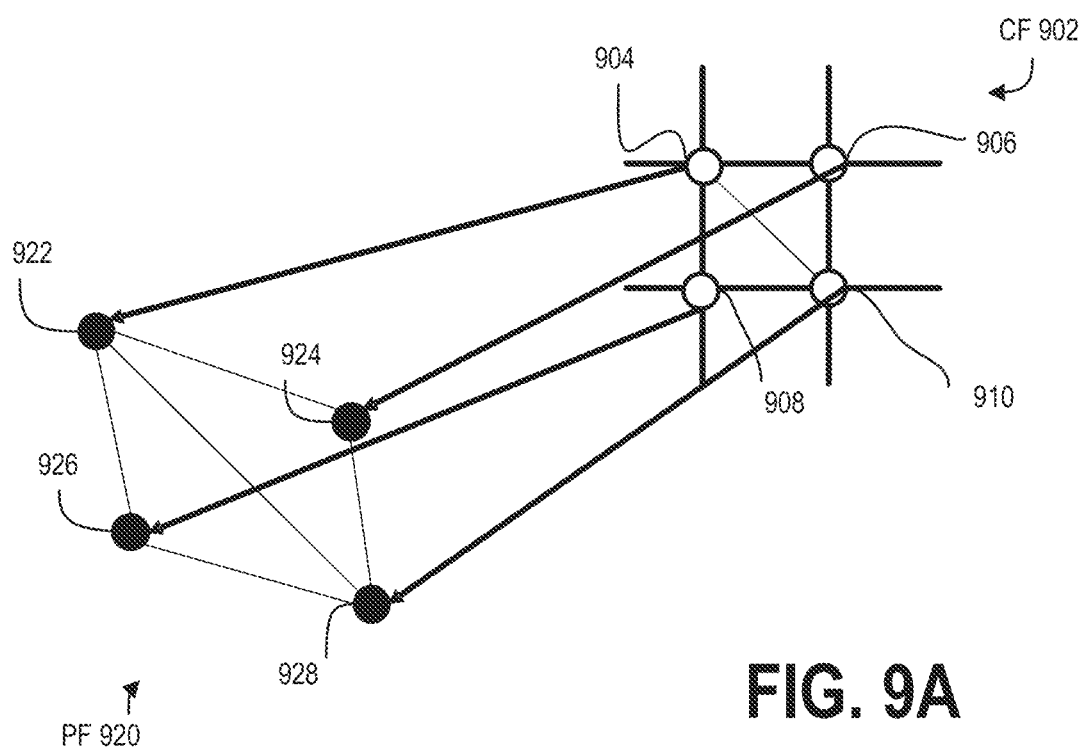
FIG. 9A shows an example diagram of an example projection from the CF to PF, using a projection MV.
Figure 9B:
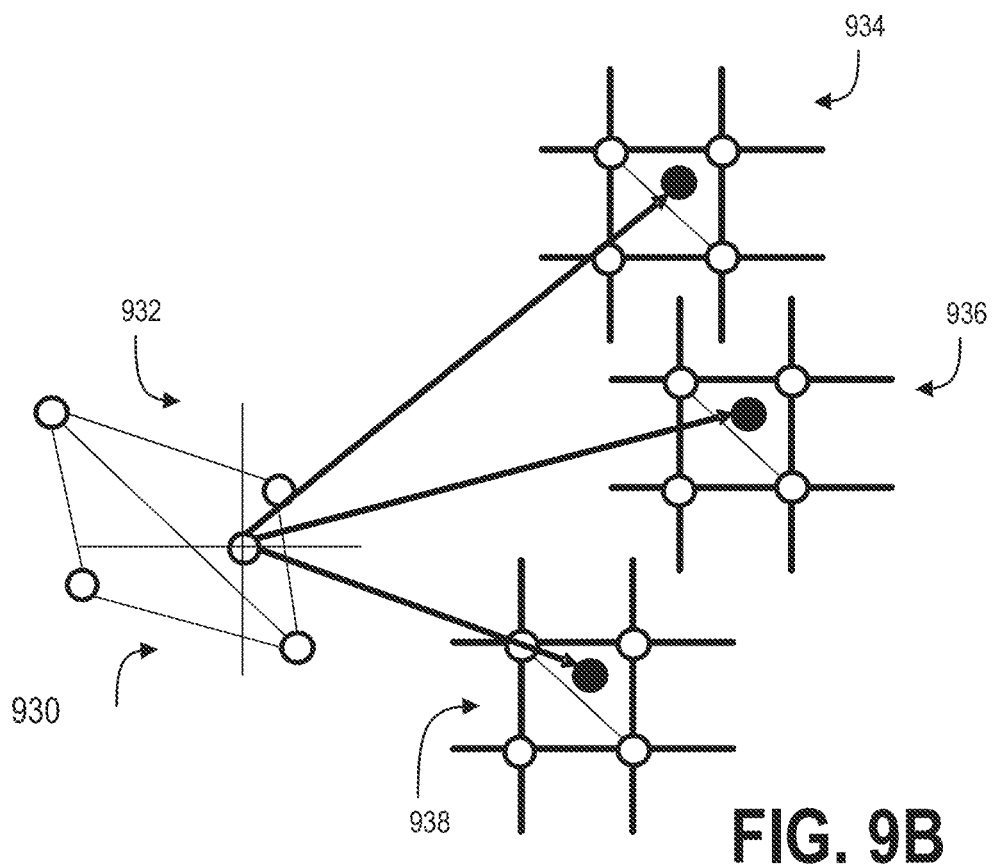
FIG. 9B shows an example diagram of the projection MVs from PF to the CF.

FIGS. 9A and 9B show an optional method for generating MV0 from MV1 by way of projecting pixels from the CF to the PF, and from the PF to the CF.

FIG. 9A shows the process of projecting from the CF 902 to PF 920 by way of MV1. Since there exists a one-to-one correspondence from the CF 902 to PF 920, pixels may be uniquely projected. In the example shown, CF pixel 904, CF pixel 906, CF pixel 908, and CF pixel 910 are shown to project to PF pixel 922, PF pixel 924, PF pixel 926, and PF pixel 928, respectively.

FIG. 9B shows the process of projecting from PF to the CF, the opposite direction of projection. A pixel 932 in PF 930 may be mapped in the 2D domain to several pixels in the CF, such as, for example, 934, 936, 938, and more. Multiple projections may be the result of projection from 3D to 2D when projecting to the near clip. Method 800 may be implemented to choose the correct projection in the CF.

Figure 9C:
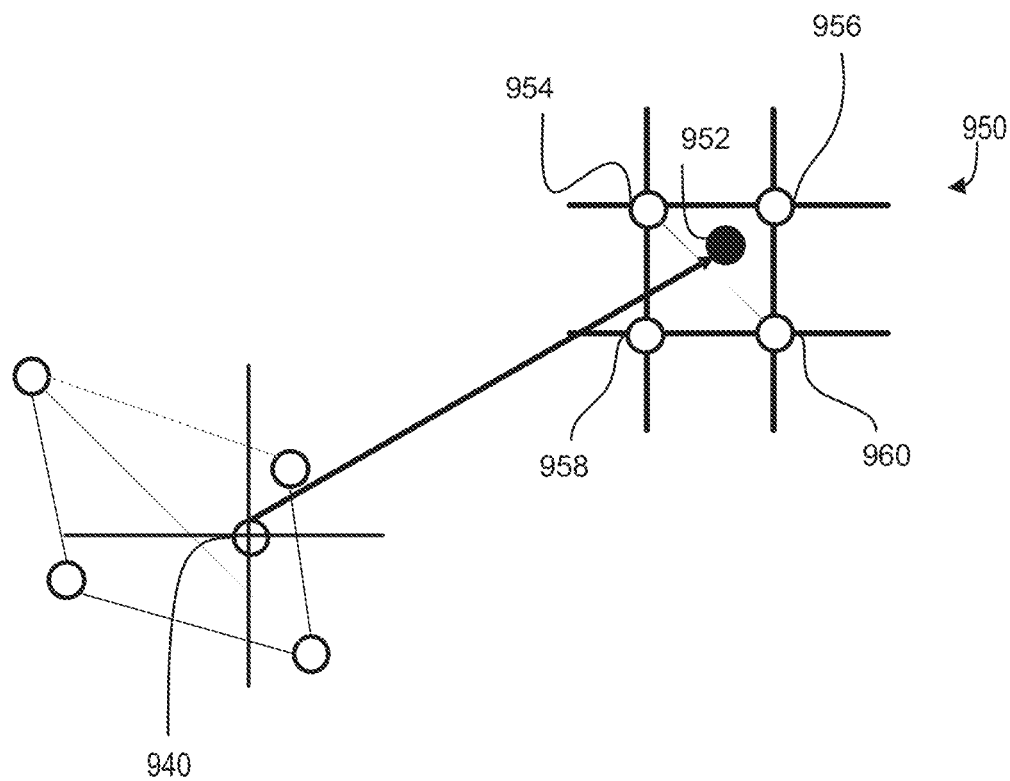
FIG. 9C shows an example method for interpolating a projection from PF to the CF.

FIG. 9C shows the interpolation of a PF pixel 940 in the CF 950. Pixel 954, pixel 956, pixel 958, and pixel 960 represent the four possible corresponding pixels within a possible projection, such as 934. Since the projected pixel 952 may be between several pixels, such as pixel 954, pixel 956, pixel 958, and pixel 960, the projection may be initially assigned a value of any such corner, then interpolated in a rasterization process, as detailed with respect to FIGS. 6A-6C.

Figure 10:
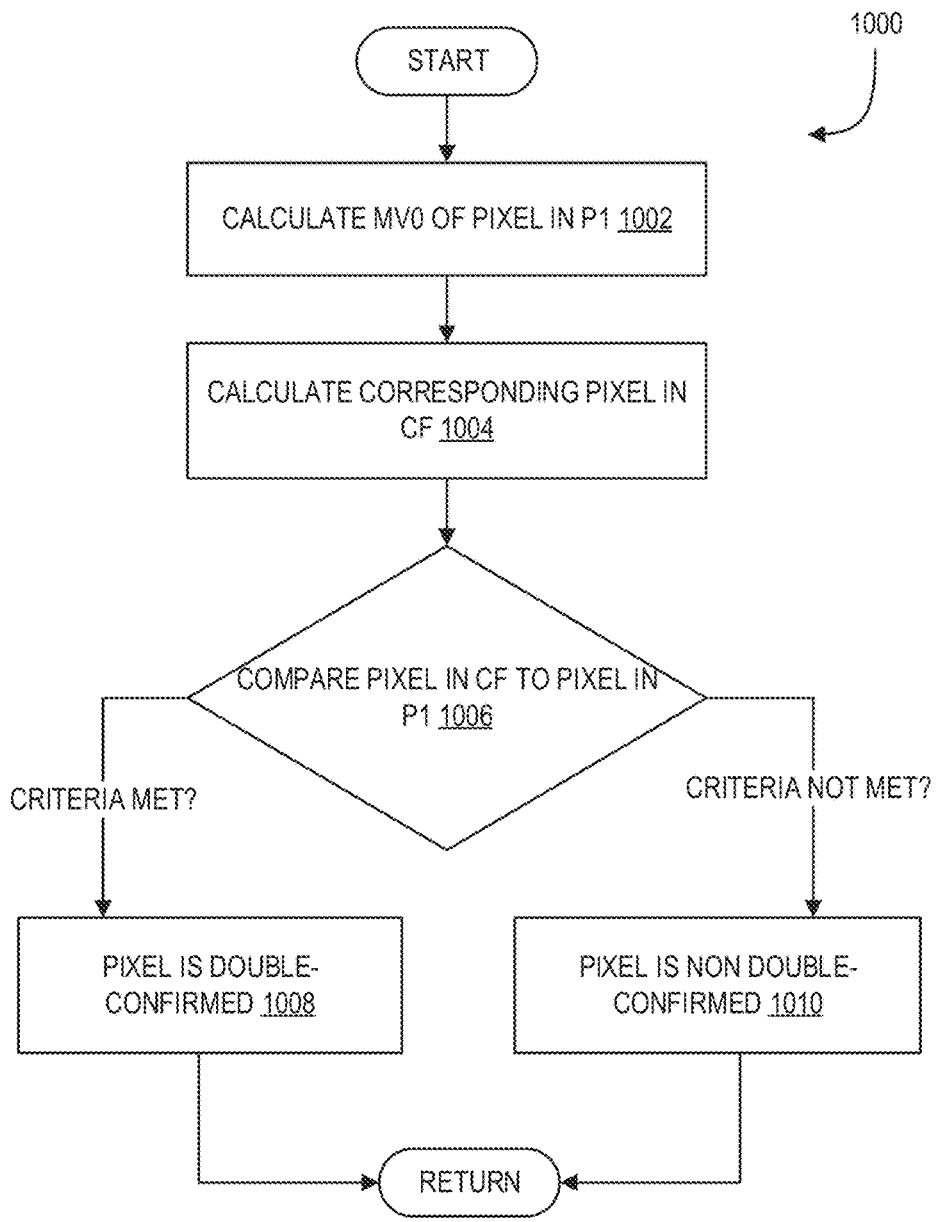
FIG. 10 shows a flowchart for an example method of determining if a pixel is double-confirmed or non-double-confirmed.

In addition to evaluating the correct MV0, a double-confirmation process may be performed. One example is the method 1000 of FIG. 10, which may be carried out according to instructions stored in computer memory, such as volatile and/or nonvolatile memory 120, and executed on one or more processors, such as processors 110. In some examples, method 1000 may be carried out by the game SDK 210 and/or the algorithm SDK 216 of FIG. 2. The double-confirmation method 1000 begins with computing the MV0 values of a selected pixel in PF at 1002. At 1004, the corresponding pixel is found in the CF, for example by using method 800. The corresponding pixel in the CF is compared to the selected pixel in PF at 1006, where one or more criteria are compared. If the criteria are met, the pixel is called double-confirmed at 1008. Otherwise, the pixel is non double-confirmed at 1010. The criteria that may be applied to double-confirm the selected pixel may include confirming that the motion vector of the pixel in PF, if added to the coordinates of the pixel in the current frame, would result in the coordinates of that pixel in the current frame. For example, a MV of a pixel in PF having a position (X0,Y0,Z0) is (delta_x0, delta_y0, delta_z0). The corresponding pixel in the CF is determined to have a position (X1,Y1,Z1). If X1=X0+delta_x; Y1=Y0+delta_y; and Z1=Z0+delta_z, then this pixel is called double confirmed.

Figure 11:
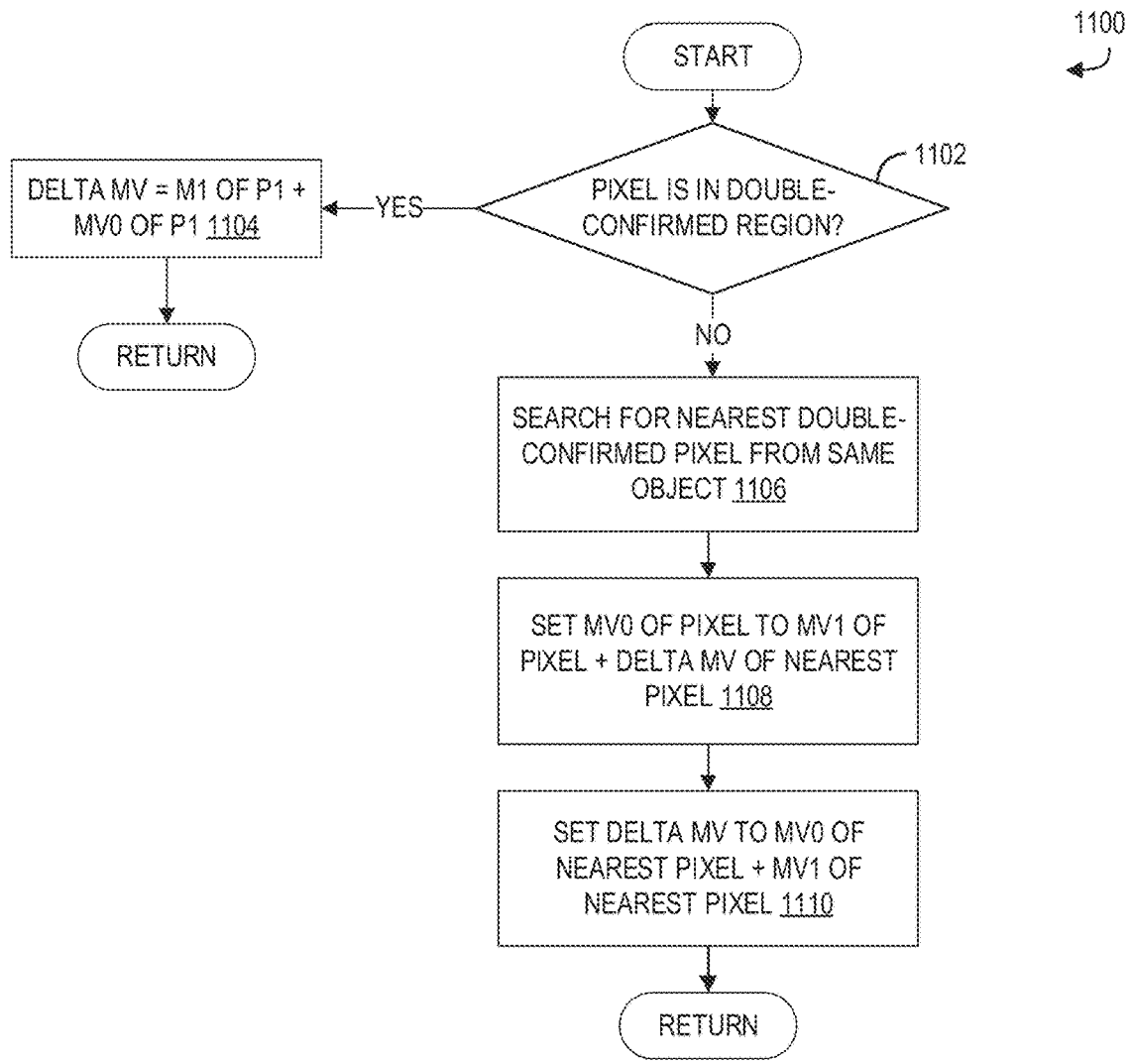
FIG. 11 shows a flowchart for an example method for adjusting MVs in non-double-confirmed regions.

FIG. 11 shows a method 1100 for adjusting MVs of pixels in non-double-confirmed regions. At 1102, a selected pixel is evaluated to determine if that pixel is in double-confirmed region. If the pixel is in the double-confirmed region (e.g., the pixel has been double-confirmed by the process described above with respect to FIG. 10), a delta MV for that pixel is computed at 1104. The delta MV for that pixel may be computed by:

$\Delta MV = MV1_{PF} + MV0_{PF}$.

The value of delta MV may then be returned. If the pixel is not in a double confirmed region, a search is performed to identify the nearest double-confirmed pixel on the same object at 1106. Additional details about identifying a nearest double-confirmed pixel are presented below. At 1108, the MV0 of the selected pixel is set to the MV1 of the selected pixel added to the delta MV of the nearest pixel, where the delta MV is calculated as explained above at 1104 (e.g., because the nearest pixel is double-confirmed), such that the delta MV of the nearest pixel is the MV0 of the nearest pixel plus the MV1 of the nearest pixel. In some examples, the delta MV of a double-confirmed pixel may only be calculated once that pixel has been identified as a nearest pixel to a non-double-confirmed pixel, and may not necessarily be calculated for all double-confirmed pixels. At 1110, the delta MV of the selected pixel may be set to the MV0 of the nearest pixel plus the MV1 of the nearest pixel.

Figure 12A:
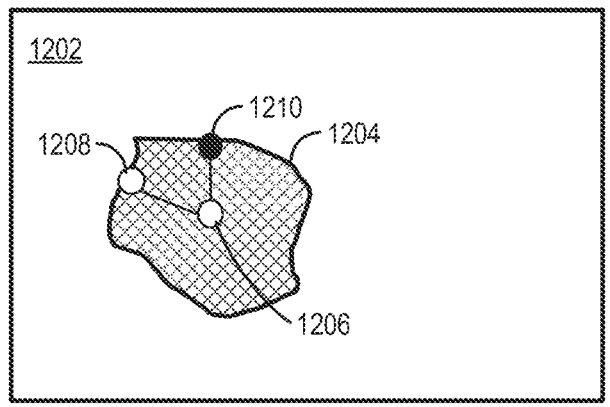
FIGS. 12A-B show an example of finding the nearest pixel in a double-confirmed region.

FIG. 12A shows an example set of pixels 1200 of a frame (e.g., a current frame) including pixels in a double-confirmed region 1202 and pixels in a non-double-confirmed region 1204. A sample input pixel 1206 (e.g., a selected pixel) is shown with two nearby pixels, a first pixel 1208 and a second pixel 1210. Both the first pixel 1208 and the second pixel 1210 are in the double-confirmed region 1202. In this example, the second pixel 1210 is closer to the input pixel 1206 than the first pixel 1208. However, the second pixel 1210 is part of a different object than the input pixel 1206 while the first pixel 1208 is part of the same object as the input pixel 1206, so the first pixel 1208 may be used as the nearest pixel in step 1106 of method 1100.

Figure 12B:
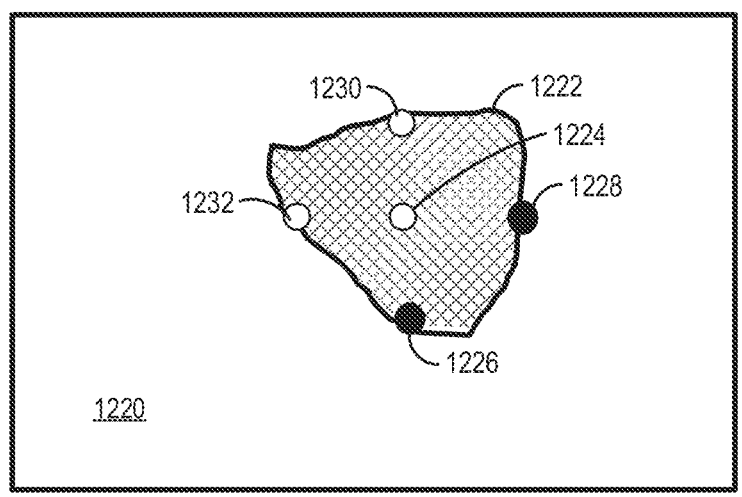

FIG. 12B shows an example set of pixels 1221 with which a window search method may be executed for locating the nearest pixel to a non-double confirmed input pixel 1224. The non-double confirmed input pixel 1224 is in a non-double confirmed region 1222. The other pixels shown in FIG. 12B, such as first pixel 1226, second pixel 1228, third pixel 1230, and fourth pixel 1232, are in the double-confirmed region 1220. The search for the closest pixel starts with the input pixel 1224 at the center, then moves left (e.g., identifying the fourth pixel 1232), right (e.g., identifying the second pixel 1228), up (e.g., identifying the third pixel 1230), and down (e.g., identifying the first pixel 1226) to locate nearest double-confirmed pixels. In the example shown, the third pixel 1230 and the fourth pixel 1232 are part of the same object as the input pixel 1224, while the first pixel 1226 and the second pixel 1228 are part of different object(s). The total number of vertical and horizontal moves to reach the third pixel 1230 from the input pixel 1224 and to reach the fourth pixel 1232 from the input pixel 1224 may then be computed to determine the distance from the input pixel 1224 to each identified nearest pixel, and the pixel with the shortest distance may be selected as the nearest pixel. The method of counting the total number of vertical and horizontal moves between the input pixel and a nearest double-confirmed pixel may be referred to as the "chess distance."

In some examples, a nearest double-confirmed pixel belonging to the same object as the input pixel/non-double-confirmed pixel may not be identified. For example, all pixels of a given object may be non-double-confirmed and thus all double-confirmed pixels surrounding the non-double-confirmed region may belong to a different object. In such examples, the non-double-confirmed region is exhibiting linear motion (e.g., a ball moving in the virtual world) and the MV0 for the pixels in the non-double-confirmed region may be set to the inverse of the MV1 for those pixels.

Figure 13:
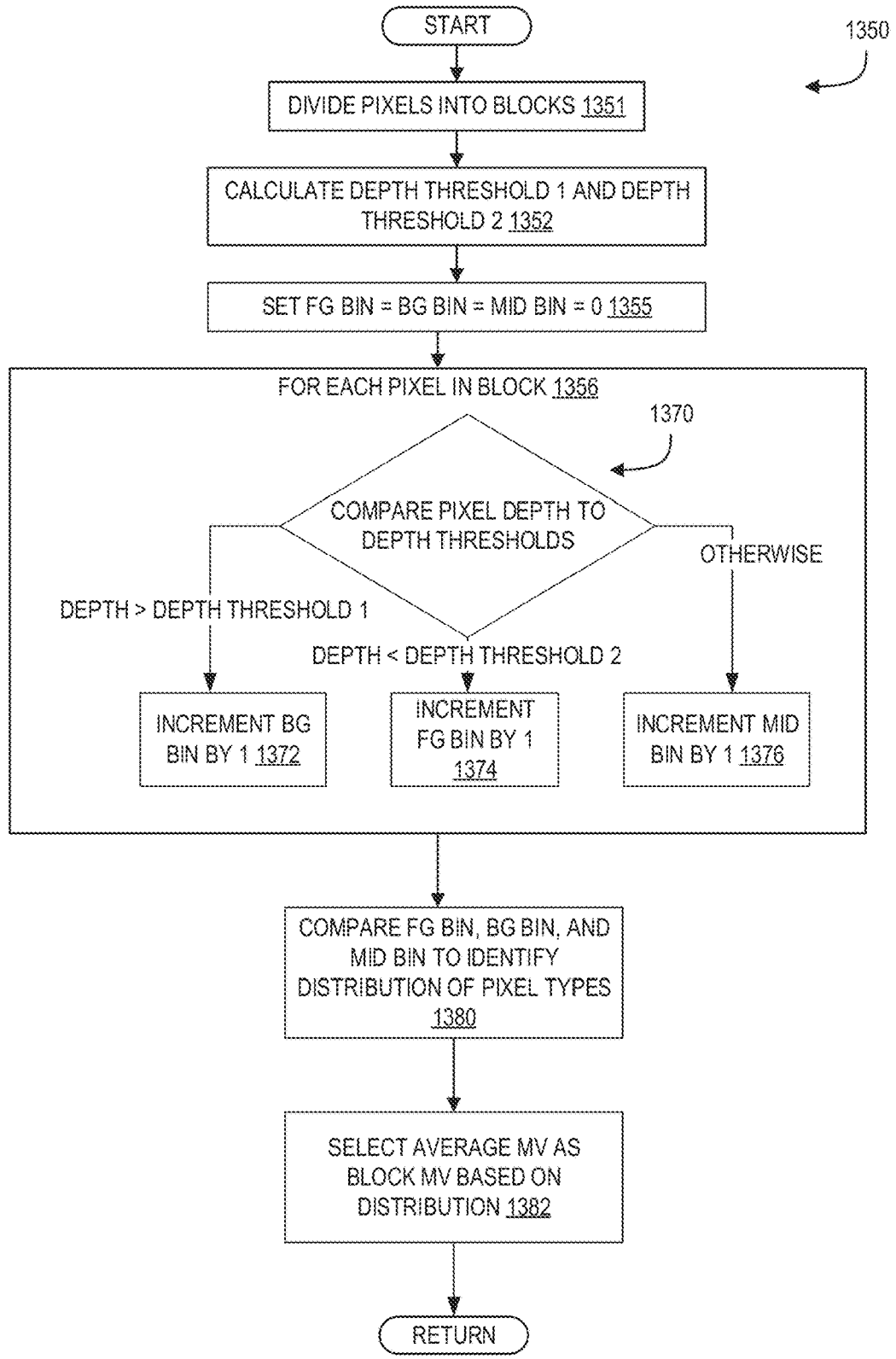
FIG. 13 shows a flowchart illustrating an example method for calculation of block motion vectors, taking pixelwise motion vectors as input.

FIG. 13 shows a method 1350 to compute a block MV from a pixel-by-pixel MV. The method 1350 occurs during the pixel MV to block MV conversion performed at 512 and 513 of method 500, which may be computed using the processors 110 and instructions in volatile and/or nonvolatile memory 120. At 1351, the pixels on the screen are divided into a plurality of blocks, e.g. finitely sized, rectangular collections of pixels. In one example (see FIG. 14), the blocks may be four-by-four squares of pixels. In general, the blocks do not need to be equally-sized or square. At 1352, two depth thresholds (depth threshold 1 and depth threshold 2) are calculated. The depth thresholds may be given, for example, by $$\text{Depth Threshold}_1 = \text{Depth}_{Max} - \frac{\text{Depth}_{Max} - \text{Depth}_{Min}}{4},$$

$$\text{Depth Threshold}_2 = \text{Depth}_{Min} + \frac{\text{Depth}_{Max} - \text{Depth}_{Min}}{4},$$

where $\text{Depth}_{Max}$ is the maximum depth value for the block and $\text{Depth}_{Min}$ is the minimum depth value in the block. In this example, a greater depth corresponds to an object further away from the camera or viewer.

At 1355, foreground (FG), background (BG), and mid-range (MID) bins are created and each given initial values of 0. The sizes of each bin may be stored as $N_{FG}$, $N_{BG}$, and $N_{MID}$. As indicated at 1356, for each pixel in the block, the depth value of the pixel (and therefore the depth value of the 2.5D motion vector) is compared to the two thresholds at 1370. If the depth is greater than depth threshold 1, the BG bin is incremented at 1372. If the depth is less than depth threshold 2, the FG bin is incremented at 1374. Otherwise, the MID bin is incremented at 1376. Note that for each pixel within the block, only one bin should be incremented.

Once each pixel within the block has been compared, the values of the FG bin, the BG bin, and the MID bin are compared at 1380 to identify a distribution of pixel types. Pixel type distribution identification may be performed to determine whether or not the depth components of the MVs exhibit a bimodal distribution; a bimodal distribution may indicate the presence of two objects within the block: a foreground object and a background object. If a bimodal distribution is not detected, disregarding the MVs with extreme depth components may result in a more stable distribution. In such a case, the mid-range pixels should be averaged. However, since the disclosed methods create only three bins to classify pixels, and the number of pixels in each block may be small (e.g. 16), a bimodal distribution may appear to be skewed towards either the foreground and background bins. Either case may indicate the presence of a foreground object. The size of the predominant bin, herein labelled as N, may be given, for example, by a process specified by the following pseudo-code:

```
IF N_MID < N_FG THEN
    IF N_FG > K_1 N_BG THEN
        SET N = N_FG
    ELSE SET N = N_BG
    END IF
ELSE IF N_MID < N_BG THEN
    IF N_FG > K_2 N_BG THEN
        SET N = N_FG
    ELSE SET N = N_BG
    END IF
ELSE
    SET N = N_MID
END IF
```

Note the two constants, $K_1$ and $K_2$, may be chosen such that $0 \leq K_1 \leq 2$ and $K_1 \leq K_2$. Both constants may be determined empirically to achieve stable distributions in the depth components of the block MVs. In some embodiments, $K_1 = K_2 = 0$. In this way, when a bimodal distribution is detected (e.g., where at least one foreground pixel and at least one background pixel are included in a block) such that a foreground object and a background object are detected in the block, only the MVs for the foreground pixels are averaged and set as the block MV for the block (even if more background pixels are present in the block than foreground pixels), which may allow for the preservation of the foreground object in the interpolated frame(s) that may otherwise be missed. When a bimodal distribution is not detected, only one object is detected in the block (whether foreground or background) and only the MVs for the mid-range pixels are averaged and set as the block MV for the block.

At 1382, method 1350 includes a step to average the MVs based on the distribution of pixel types. For example, the block MV may be given by a formula such as $$(MV_x, MV_y, \text{depth})_{block} = \frac{1}{N} \sum_{i=1}^{N} (MV_x, MV_y, \text{depth})_{pixel\ i},$$

where N represents which bin is being averaged over, as determined by step 680 above. The sum is performed over all pixelwise MVs (either MV0 or MV1) within the bin corresponding to N, e.g. if $N=N_{BG}$, the sum is performed over all background pixels, etc. Addition here is performed according to standard vector addition, e.g. $(x_1, y_1, z_1)+(x_2, y_2, z_2)=(x_1+x_2, y_1+y_2, z_1+z_2)$. Method 1350 then returns, using the averaged MV as its return value.

Figure 14:
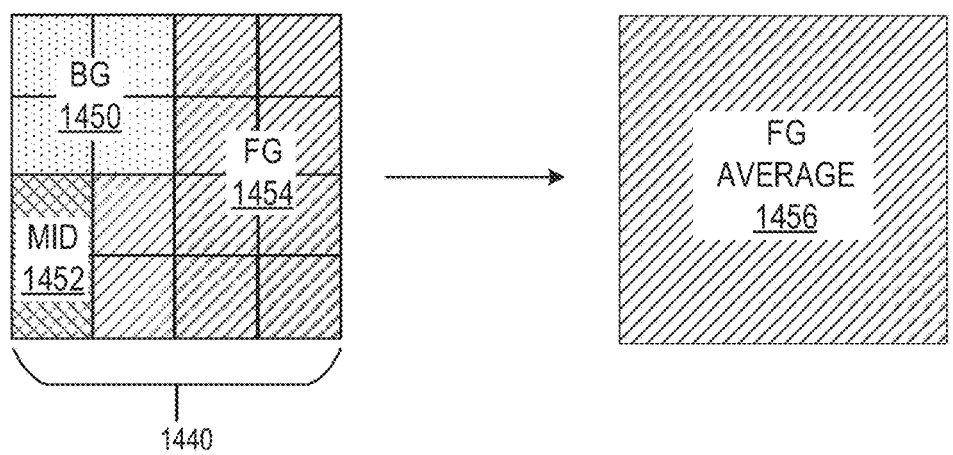
FIG. 14 schematically shows an example of a pixelwise MV conversion into a block MV.

FIG. 14 shows an example of processing the pixel MVs into the block MVs. In this case, a block of pixel MVs 1440 includes a collection of foreground range pixel MVs 1454 (shown in FIG. 14 with diagonal lines), a collection of background range pixel MVs 1450 (shown in FIG. 14 as a dotted pattern) and a collection of mid-range pixel MVs 1452 (shown in FIG. 14 as being cross-hatched) are shown. Depth is used to decide which range each pixel belongs to, e.g., pixel MVs within a first depth range are assigned as being background pixels, pixels within a second depth range are assigned as being mid-range pixels, and pixels of a third depth range are assigned as being foreground pixels. Since the majority (10 of 16) of pixel MVs within the block of pixel MVs 1440 fall within the foreground depth range, the depth values of the foreground range pixel MVs 1454 are averaged to produce a single depth value that is applied to all pixel MVs of the block MV, thereby generating a block MV 1456. In addition, the x- and y-components (not shown) of the foreground MVs are also averaged and output in the block MV. The block MV is therefore comprised of three semi-independent textures: the x-component, the y-component, and the depth component, each independently averaged within the pixels fitting within the depth range. This technique applies to both MV1 and MV0.

The technical effect of generating an MV1 texture and an MV0 texture of a current frame, where the MV1 texture and the MV0 texture each include depth values, is that the MV1 texture and MV0 texture may be converted to MV1 and MV0 blocks, respectively, using the depth values so that the resulting motion vector may more closely match the motion occurring within the frame. Another technical effect is the block MV1 and block MV0 with depth values may be used to perform frame interpolation, thereby increasing a framerate.

The disclosure also provides support for a method, comprising: generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture, each MV0 determined based on a camera MV0 and an object MV0, converting the MV1 texture to a set of MV1 pixel blocks and converting the MV0 texture to a set of MV0 pixel blocks, and outputting the set of MV1 pixel blocks and the set of MV0 pixel blocks for image processing. In a first example of the method represents a change in a position of a vertex at that pixel from the current frame to a previous frame, wherein each MV0 represents a change in a position of the vertex at that pixel from the previous frame to the current frame, wherein the camera MV0 represents a change in a position of the vertex at that pixel from the previous frame to the current due to a change in position or orientation of a virtual camera, and wherein the object MV0 represents a change in a position of the vertex at that pixel from the previous frame to the current due to a change in position of the object in a world space. In a second example of the method, optionally including the first example, the method further comprises: for a selected pixel, determining the camera MV0 for the selected pixel based on a world space position of the selected pixel's corresponding vertex in the previous frame. In a third example of the method, optionally including one or both of the first and second examples, determining the camera MV0 for the selected pixel based on the world space position of the selected pixel's corresponding vertex in the previous frame comprises: determining an eye space position of the vertex based on a depth of the selected vertex in the previous frame and a ray pointing from the virtual camera to the selected vertex on a near clip of a homogenous clip space and applying an inversed view matrix from the previous frame to the eye space position to determine the world space position, applying a first view matrix of the current frame to the world space position to generate a position of the selected vertex in the homogenous clip space, applying a second view matrix of the previous frame to the world space position to generate a preposition of the selected vertex in the homogenous clip space, and calculating the camera MV0 as a difference between the position and the preposition, in each of a vertical axis, a horizontal axis, and a depth axis. In a fourth example of the method, optionally including one or more or each of the first through third examples, the method further comprises: for a selected pixel, determining the object MV0 for the selected pixel based on an eye space position of a selected vertex corresponding to the selected pixel in the previous frame. In a fifth example of the method, optionally including one or more or each of the first through fourth examples, determining the object MV0 for the selected pixel based on the eye space position of the selected vertex in the previous frame comprises: calculating the eye space position of the selected vertex in the previous frame and calculating an eye space position of the selected vertex in the current frame, each based on a corresponding model matrix and view projection matrix, interpolating the eye space position in the previous frame and the eye space position in the current frame into a homogenous clip space to generate an input position and an input preposition, respectively, calculating the object MV0 as a difference between the input position and the input preposition, in each of a vertical axis, a horizontal axis, and a depth axis, and assigning the object MV0 to the selected pixel based on the on-screen location of the selected vertex. In a sixth example of the method, optionally including one or more or each of the first through fifth examples, converting the MV1 texture to the set of MV1 pixel blocks comprises identifying, for each pixel block of a plurality of pixel blocks of the MV1 texture, a distribution of pixel types in that pixel block and converting the MV1 texture to the set of MV1 pixel blocks based on the distribution of pixel types for each pixel block. In a seventh example of the method, optionally including one or more or each of the first through sixth examples, converting the MV1 texture to the set of MV1 pixel blocks based on the distribution of pixel types for each pixel block comprises: if the distribution of a selected pixel block is bimodal such that at least one background pixel and at least one foreground pixel are present in the selected pixel block, calculating an average MV1 over only foreground pixels in the selected pixel block, otherwise calculating the average MV1 over only mid-range pixels in the selected pixel block. In an eighth example of the method, optionally including one or more or each of the first through seventh examples, converting the MV0 texture to the set of MV0 pixel blocks comprises identifying, for each pixel block of a plurality of pixel blocks of the MV0 texture, a distribution of pixel types in that pixel block and converting the MV0 texture to the set of MV0 pixel blocks based on the distribution of pixel types for each pixel block. In a ninth example of the method, optionally including one or more or each of the first through eighth examples, converting the MV0 texture to the set of MV0 pixel blocks based on the distribution of pixel types for each pixel block comprises: if the distribution of a selected pixel block is bimodal such that at least one background pixel and at least one foreground pixel are present in the selected pixel block, calculating an average MV0 over only foreground pixels in the selected pixel block, otherwise calculating the average MV0 over only mid-range pixels in the selected pixel block. In a tenth example of the method, optionally including one or more or each of the first through ninth examples, the method further comprises: applying a double-confirm process to each MV0 and each MV1, wherein the double-confirm process includes confirming each associated depth value. In a eleventh example of the method, optionally including one or more or each of the first through tenth examples, applying the double-confirm process includes, for a selected pixel in the current frame, double confirming the MV1 or MV0 for the selected pixel responsive to coordinates of the selected pixel in the current frame matching coordinates of that pixel mapped back to the previous frame using the MV1 or MV0 for the selected pixel, the coordinates of the selected pixel including a depth coordinate.

The disclosure also provides support for a system for rendering 3D graphics, comprising: one or more processors and non-transitory memory allocated to form: a motion vector module configured to receive 3D model information from a game engine and configured to output a plurality of 1-phase motion vectors (MV1s) and a plurality of 0-phase motion vectors (MV0s) based on the 3D model information, each MV1 comprising a change in a vertical position, a change in a horizontal position, and a change in a depth position of an object at a respective vertex from a current frame to a previous frame, each MV0 comprising a change in a vertical position, a change in a horizontal position, and a change in a depth position at a respective vertex from the previous frame to the current frame, wherein the motion vector module caches a subset of the 3D model information in order to calculate each MV0, including caching a depth buffer and an inversed view matrix from the previous frame, and a block motion vector module configured to generate a block MV1 texture and a block MV0 texture from the plurality of MV1s and the plurality of MV0s, respectively, and output the block MV1 texture and the block MV0 texture for image processing in order to form an image to be displayed on a display, wherein the block MV1 texture comprises a plurality of MV1 blocks each formed from a respective subset of the plurality of MV1s, and wherein the block MV0 texture comprises a plurality of MV0 blocks each formed from a respective subset of the plurality of MV0s. In a first example of the system, the block MV1 texture and the block MV0 texture are usable to interpolate a frame between the current frame and the previous frame. In a second example of the system, optionally including the first example is determined based on a respective camera MV0 and a respective object MV0, where a camera MV0 for a selected vertex is determined based on a world space position of the selected vertex in the previous frame determined based on the cached depth buffer and inversed view matrix, where an object MV0 for the selected vertex is determined based on an eye space position of the selected vertex in the previous frame and an eye space position of the selected vertex in the current frame. In a third example of the system, optionally including one or both of the first and second examples is assigned a respective pixel based on a location of a corresponding vertex. In a fourth example of the system, optionally including one or more or each of the first through third examples is assigned a respective pixel based on a location of a corresponding vertex. In a fifth example of the system, optionally including one or more or each of the first through fourth examples block comprises an average change in horizontal position for that respective subset of the plurality of MV1s, an average change in vertical position for that respective subset of the plurality of MV1s, and an average depth value for that respective subset of the plurality of MV1s, and wherein each MV0 block comprises an average change in horizontal position for that respective subset of the plurality of MV0s, an average change in vertical position for that respective subset of the plurality of MV0s, and an average depth value for that respective subset of the plurality of MV0s.

The disclosure also provides support for a method, comprising: receiving, from a game engine, 3D model information usable to render a first current frame on a 2D screen, caching a subset of the 3D model information, including caching a depth texture and an inversed view projection matrix, receiving, from the game engine, updated 3D model information usable to render a second current frame on the 2D screen, including an updated depth texture and an updated inversed view projection matrix, calculating a plurality of 0-phase motion vectors from the updated 3D model information and the cached depth texture and inversed view projection matrix, outputting the plurality of 0-phase motion vectors as block 0-phase motion vectors for image processing. In a first example of the method, the 3D model information includes the first current frame and the updated 3D model information includes the second current frame, and further comprising calculating a plurality of 1-phase motion vectors from the updated 3D model information, the updated depth texture, and the inversed view projection matrix, and outputting the plurality of 1-phase motion vectors as block 1-phase motion vectors for image processing.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   generating, for each pixel of one or more objects to be rendered in a current frame, a 1-phase motion vector (MV1) and a 0-phase motion vector (MV0), each MV1 and MV0 having an associated depth value, to thereby form an MV1 texture and an MV0 texture, each MV0 determined based on a camera MV0 and an object MV0; and
   outputting the MV1 texture and the MV0 texture for image processing.

2. The method of claim 1, wherein each MV1 represents a change in a position of a vertex at that pixel from the current frame to a previous frame, wherein each MV0 represents a change in a position of the vertex at that pixel from the previous frame to the current frame, wherein the camera MV0 represents a change in a position of the vertex at that pixel from the previous frame to the current due to a change in position or orientation of a virtual camera, and wherein the object MV0 represents a change in a position of the vertex at that pixel from the previous frame to the current due to a change in position of the object in a world space.

3. The method of claim 2, further comprising, for a selected pixel, determining the camera MV0 for the selected pixel based on a world space position of the selected pixel's corresponding vertex in the previous frame.

4. The method of claim 3, wherein determining the camera MV0 for the selected pixel based on the world space position of the selected pixel's corresponding vertex in the previous frame comprises:

determining an eye space position of the vertex based on a depth of the selected vertex in the previous frame and a ray pointing from the virtual camera to the selected vertex on a near clip of a homogenous clip space and applying an inversed view matrix from the previous frame to the eye space position to determine the world space position;

applying a first view matrix of the current frame to the world space position to generate a position of the selected vertex in the homogenous clip space;

applying a second view matrix of the previous frame to the world space position to generate a preposition of the selected vertex in the homogenous clip space; and calculating the camera MV0 as a difference between the position and the preposition, in each of a vertical axis, a horizontal axis, and a depth axis.

5. The method of claim 2, further comprising for a selected pixel, determining the object MV0 for the selected pixel based on an eye space position of a selected vertex corresponding to the selected pixel in the previous frame.

6. The method of claim 5, wherein determining the object MV0 for the selected pixel based on the eye space position of the selected vertex in the previous frame comprises:

calculating the eye space position of the selected vertex in the previous frame and calculating an eye space position of the selected vertex in the current frame, each based on a corresponding model matrix and view projection matrix;

interpolating the eye space position in the previous frame and the eye space position in the current frame into a homogenous clip space to generate an input position and an input preposition, respectively;

calculating the object MV0 as a difference between the input position and the input preposition, in each of a vertical axis, a horizontal axis, and a depth axis; and assigning the object MV0 to the selected pixel based on the on-screen location of the selected vertex.

7. The method of claim 2, further comprising processing the MV1 texture and the MV0 texture based on each associated depth value, and wherein outputting the MV1 texture and the MV0 texture for image processing comprises outputting the processed MV1 texture and the processed MV0 texture for image processing.

8. The method of claim 7, wherein processing the MV1 texture and the MV0 texture comprises converting the MV1 texture to a set of MV1 pixel blocks and converting the MV0 texture to a set of MV0 pixel blocks.

9. The method of claim 8, wherein converting the MV1 texture to the set of MV1 pixel blocks comprises identifying, for each pixel block of a plurality of pixel blocks of the MV1 texture, a distribution of pixel types in that pixel block based on each associated depth value and converting the MV1 texture to the set of MV1 pixel blocks based on the distribution of pixel types for each pixel block.

10. The method of claim 9, wherein converting the MV1 texture to the set of MV1 pixel blocks based on the distribution of pixel types for each pixel block comprises:

if the distribution of a selected pixel block is bimodal such that at least one background pixel and at least one foreground pixel are present in the selected pixel block, calculating an average MV1 over only foreground pixels in the selected pixel block, otherwise calculating the average MV1 over only mid-range pixels in the selected pixel block.

11. The method of claim 8, wherein converting the MV0 texture to the set of MV0 pixel blocks comprises identifying, for each pixel block of a plurality of pixel blocks of the MV0 texture, a distribution of pixel types in that pixel block based on each associated depth value and converting the MV0 texture to the set of MV0 pixel blocks based on the distribution of pixel types for each pixel block.

12. The method of claim 11, wherein converting the MV0 texture to the set of MV0 pixel blocks based on the distribution of pixel types for each pixel block comprises:

if the distribution of a selected pixel block is bimodal such that at least one background pixel and at least one foreground pixel are present in the selected pixel block, calculating an average MV0 over only foreground pixels in the selected pixel block, otherwise calculating the average MV0 over only mid-range pixels in the selected pixel block.

13. The method of claim 2, further comprising applying a double-confirm process to each MV0 and each MV1, wherein the double-confirm process includes confirming each associated depth value.

14. The method of claim 13, wherein applying the double-confirm process includes, for a selected pixel in the current frame, double confirming the MV1 or MV0 for the selected pixel responsive to coordinates of the selected pixel in the current frame matching coordinates of that pixel mapped back to the previous frame using the MV1 or MV0 for the selected pixel, the coordinates of the selected pixel including a depth coordinate.

15. A system for rendering 3D graphics, comprising:

one or more processors and non-transitory memory allocated to form:

a first motion vector module configured to receive 3D model information from a game engine and configured to output a plurality of 1-phase motion vectors (MV1s) and a plurality of 0-phase motion vectors (MV0s) based on the 3D model information, each MV1 comprising a change in a vertical position, a change in a horizontal position, and a change in a depth position of an object at a respective vertex from a current frame to a previous frame, each MV0 comprising a change in a vertical position, a change in a horizontal position, and a change in a depth position at a respective vertex from the previous frame to the current frame, wherein the motion vector module caches a subset of the 3D model information in order to calculate each MV0, including caching a depth buffer and an inversed view matrix from the previous frame; and a second motion vector module configured to generate an MV1 texture and an MV0 texture from the plurality of MV1s and the plurality of MV0s, respectively, and output the MV1 texture and the MV0 texture for image processing in order to form an image to be displayed on a display.

16. The system of claim 15, wherein the MV1 texture and the MV0 texture are usable to interpolate a frame between the current frame and the previous frame.

17. The system of claim 15, wherein each MV0 is determined based on a respective camera MV0 and a respective object MV0, where a camera MV0 for a selected vertex is determined based on a world space position of the selected vertex in the previous frame determined based on the cached depth buffer and inversed view matrix, where an object MV0 for the selected vertex is determined based on an eye space position of the selected vertex in the previous frame and an eye space position of the selected vertex in the current frame.

18. The system of claim 15, where each MV1 and each MV0 is assigned a respective pixel based on a location of a corresponding vertex.

19. A method, comprising:
- receiving, from a game engine, 3D model information usable to render a first current frame on a 2D screen;
- caching a subset of the 3D model information, including caching a depth texture and an inversed view projection matrix;
- receiving, from the game engine, updated 3D model information usable to render a second current frame on the 2D screen, including an updated depth texture and an updated inversed view projection matrix;
- calculating a plurality of 0-phase motion vectors from the updated 3D model information and the cached depth texture and inversed view projection matrix;
- outputting the plurality of 0-phase motion vectors for image processing.

20. The method of claim 19, wherein the 3D model information includes the first current frame and the updated 3D model information includes the second current frame, and further comprising calculating a plurality of 1-phase motion vectors from the updated 3D model information, the updated depth texture, and the inversed view projection matrix; and
- outputting the plurality of 1-phase motion vectors for image processing.

\* \* \* \* \*

UNITED STATES PATENT AND TRADEMARK OFFICE
CERTIFICATE OF CORRECTION

PATENT NO. : 12,148,086 B2
APPLICATION NO. : 18/513217
DATED : November 19, 2024
INVENTOR(S) : Hongmin Zhang et al.

It is certified that error appears in the above-identified patent and that said Letters Patent is hereby corrected as shown below:

In the Claims

In Claim 15, Column 24, Lines 34 and 49, correct "O" to "0" in both instances that "MVOs" is written.

Signed and Sealed this
Twenty-fourth Day of December, 2024

Derrick Brent
*Acting Director of the United States Patent and Trademark Office*